(12) United States Patent
Perlman

(10) Patent No.: US 8,125,940 B2
(45) Date of Patent: *Feb. 28, 2012

(54) SELF-CONFIGURING, ADAPTIVE, THREE-DIMENSIONAL, WIRELESS NETWORK

(75) Inventor: Stephen G. Perlman, Palo Alto, CA (US)

(73) Assignee: OnLive, Palo Alto, CA (US)

( * ) Notice: Subject to any disclaimer, the term of this patent is extended or adjusted under 35 U.S.C. 154(b) by 1384 days.

This patent is subject to a terminal disclaimer.

(21) Appl. No.: 10/618,931

(22) Filed: Jul. 14, 2003

(65) Prior Publication Data

US 2005/0176452 A1 Aug. 11, 2005

Related U.S. Application Data

(63) Continuation of application No. 10/367,197, filed on Feb. 14, 2003, now Pat. No. 7,590,084.

(51) Int. Cl.
*H04J 3/08* (2006.01)
(52) U.S. Cl. ......... 370/326; 370/468; 370/492; 370/501
(58) Field of Classification Search .................. 370/277, 370/279, 293, 310.2, 315, 319–322, 326, 370/492, 501; 455/3.05, 11.1, 15, 16, 426.1, 455/450, 451, 452.1
See application file for complete search history.

(56) References Cited

U.S. PATENT DOCUMENTS

| 4,539,706 | A | 9/1985 | Mears et al. |
| 5,058,199 | A | 10/1991 | Grube |
| 5,129,096 | A | 7/1992 | Burns |
| 5,222,246 | A | 6/1993 | Wolkstein |
| 5,357,604 | A | 10/1994 | San et al. |
| 5,408,679 | A | 4/1995 | Masuda |
| 5,509,028 | A | 4/1996 | Marque-Pucheu |
| 5,574,979 | A | 11/1996 | West |
| 5,586,257 | A | 12/1996 | Perlman |

(Continued)

FOREIGN PATENT DOCUMENTS

EP 1 094 642 A2 4/2001

(Continued)

OTHER PUBLICATIONS

Bronez, T. et al., "Shipboard Experiments for a Multihop 802 11 Communications System—RF Channel Characterization and MAC Performance Measurement," IEEE Military Communications Conference, MILCOM 2005. Oct. 2005, vol. 1, pp. 557-563.*

(Continued)

*Primary Examiner* — Donald Mills
(74) *Attorney, Agent, or Firm* — The Law Offices of Bradley J. Bereznak

(57) ABSTRACT

A network for wireless transmission of a media data in a building includes a plurality of access points. A first access point receives the media data from a source and transmits the media data downstream at a first data rate. A plurality of additional access points is distributed about the building, each of which includes an upstream transceiver to receive the media content on a first channel and a downstream transceiver to re-transmit the media content at substantially the first data rate on a second channel. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

23 Claims, 18 Drawing Sheets

U.S. PATENT DOCUMENTS

| | | | |
|---|---|---|---|
| 5,599,232 A | 2/1997 | Darling | |
| 5,608,412 A | 3/1997 | Welles, II | |
| 5,618,045 A | 4/1997 | Kagan et al. | |
| 5,640,386 A | 6/1997 | Wiedeman | |
| 5,654,747 A | 8/1997 | Ottesen et al. | |
| 5,732,076 A | 3/1998 | Ketseoglou et al. | |
| 5,742,680 A | 4/1998 | Wilson | |
| 5,815,146 A | 9/1998 | Youden et al. | |
| 5,870,665 A | 2/1999 | Uchikawa | |
| 5,890,055 A | 3/1999 | Chu et al. | |
| 5,915,020 A | 6/1999 | Tilford et al. | |
| 5,959,592 A | 9/1999 | Petruzzelli | |
| 5,987,376 A | 11/1999 | Olson | |
| 5,999,808 A | 12/1999 | LaDue | |
| 6,009,060 A | 12/1999 | Kim | |
| 6,009,096 A | 12/1999 | Jaisingh et al. | |
| 6,092,117 A | 7/2000 | Gladwin et al. | |
| 6,115,369 A * | 9/2000 | Oura | 370/337 |
| 6,132,306 A | 10/2000 | Trompower | |
| 6,148,142 A | 11/2000 | Anderson | |
| 6,160,993 A | 12/2000 | Wilson | |
| 6,166,703 A | 12/2000 | Muterspaugh | |
| 6,175,854 B1 | 1/2001 | Bretscher | |
| 6,188,571 B1 | 2/2001 | Roganti et al. | |
| 6,205,185 B1 | 3/2001 | Kajiwara | |
| 6,212,681 B1 | 4/2001 | Ikeda | |
| 6,263,503 B1 | 7/2001 | Margulis | |
| 6,323,909 B1 | 11/2001 | Michener et al. | |
| 6,334,045 B1 | 12/2001 | Green, Sr. et al. | |
| 6,347,216 B1 | 2/2002 | Marko | |
| 6,397,038 B1 | 5/2002 | Green et al. | |
| 6,404,775 B1 | 6/2002 | Leslie et al. | |
| 6,409,602 B1 | 6/2002 | Wiltshire et al. | |
| 6,412,112 B1 | 6/2002 | Barrett et al. | |
| 6,424,817 B1 | 7/2002 | Hadden et al. | |
| 6,430,233 B1 | 8/2002 | Dillon et al. | |
| 6,473,858 B1 | 10/2002 | Shimomura et al. | |
| 6,584,080 B1 | 6/2003 | Ganz et al. | |
| 6,585,596 B1 | 7/2003 | Leifer et al. | |
| 6,597,891 B2 | 7/2003 | Tantawy et al. | |
| 6,600,730 B1 | 7/2003 | Davis et al. | |
| 6,614,768 B1 | 9/2003 | Mahany et al. | |
| 6,631,410 B1 | 10/2003 | Kowalski et al. | |
| 6,650,869 B2 | 11/2003 | Kelly et al. | |
| 6,667,994 B1 | 12/2003 | Monden et al. | |
| 6,671,186 B2 | 12/2003 | Kopf | |
| 6,678,502 B1 | 1/2004 | Sugaya et al. | |
| 6,684,058 B1 | 1/2004 | Karacaoglu et al. | |
| 6,690,657 B1 * | 2/2004 | Lau et al. | 370/315 |
| 6,690,726 B1 | 2/2004 | Yavits et al. | |
| 6,690,926 B2 | 2/2004 | Tawil et al. | |
| 6,728,541 B2 | 4/2004 | Ohkura et al. | |
| 6,741,841 B1 | 5/2004 | Mitchell | |
| 6,745,050 B1 | 6/2004 | Forsythe et al. | |
| 6,757,913 B2 | 6/2004 | Knox | |
| 6,788,882 B1 | 9/2004 | Geer et al. | |
| 6,811,113 B1 | 11/2004 | Silansky et al. | |
| 6,832,071 B1 | 12/2004 | Nakamura et al. | |
| 6,836,658 B1 | 12/2004 | Sharon et al. | |
| 6,842,617 B2 * | 1/2005 | Williams et al. | 455/444 |
| 6,845,090 B1 | 1/2005 | Takabatake et al. | |
| 6,847,625 B2 | 1/2005 | Heinonen et al. | |
| 6,850,285 B2 | 2/2005 | Eaton et al. | |
| 6,853,197 B1 | 2/2005 | McFarland et al. | |
| 6,856,786 B2 | 2/2005 | Belostotsky et al. | |
| 6,886,029 B1 | 4/2005 | Pecus et al. | |
| 6,925,285 B2 | 8/2005 | Kim | |
| 6,944,139 B1 | 9/2005 | Campanella | |
| 6,968,153 B1 | 11/2005 | Heinonen et al. | |
| 7,072,627 B2 | 7/2006 | Coffin, III | |
| 7,215,660 B2 * | 5/2007 | Perlman | 370/338 |
| 7,289,478 B1 | 10/2007 | Kim et al. | |
| 7,471,665 B2 | 12/2008 | Perlman | |
| 7,493,078 B2 | 2/2009 | Perlman | |
| 7,558,525 B2 | 7/2009 | Perlman | |
| 7,567,527 B2 | 7/2009 | Perlman | |
| 7,590,084 B2 | 9/2009 | Perlman | |
| 7,593,361 B2 | 9/2009 | Perlman | |
| 7,684,752 B2 | 3/2010 | Perlman | |
| 7,715,336 B2 | 5/2010 | Perlman | |
| 2002/0028655 A1 * | 3/2002 | Rosener et al. | 455/16 |
| 2002/0038459 A1 | 3/2002 | Talmola et al. | |
| 2002/0046285 A1 * | 4/2002 | Yasushi et al. | 709/228 |
| 2002/0059614 A1 | 5/2002 | Lipsanen et al. | |
| 2002/0061743 A1 | 5/2002 | Hutcheson et al. | |
| 2002/0068592 A1 | 6/2002 | Hutcheson et al. | |
| 2002/0071658 A1 | 6/2002 | Marko et al. | |
| 2002/0072329 A1 | 6/2002 | Bandeira et al. | |
| 2002/0106119 A1 | 8/2002 | Foran et al. | |
| 2002/0115409 A1 * | 8/2002 | Khayrallah | 455/41 |
| 2002/0152303 A1 | 10/2002 | Dispensa | |
| 2002/0154055 A1 | 10/2002 | Davis | |
| 2002/0157115 A1 | 10/2002 | Lu | |
| 2002/0181189 A1 | 12/2002 | Yang et al. | |
| 2002/0181190 A1 | 12/2002 | Yang | |
| 2002/0188955 A1 | 12/2002 | Thompson et al. | |
| 2003/0054827 A1 | 3/2003 | Schmidl et al. | |
| 2003/0065805 A1 | 4/2003 | Barnes, Jr. | |
| 2003/0079016 A1 | 4/2003 | Tsao et al. | |
| 2003/0124977 A1 | 7/2003 | Smith et al. | |
| 2003/0135860 A1 | 7/2003 | Dureau | |
| 2003/0139150 A1 | 7/2003 | Rodriguez et al. | |
| 2003/0181162 A1 | 9/2003 | Matula | |
| 2003/0181229 A1 | 9/2003 | Forster et al. | |
| 2003/0199247 A1 | 10/2003 | Striemer | |
| 2003/0207684 A1 | 11/2003 | Wesel | |
| 2003/0216144 A1 | 11/2003 | Roese et al. | |
| 2003/0220072 A1 | 11/2003 | Coffin, III | |
| 2003/0231774 A1 | 12/2003 | Schildbach et al. | |
| 2003/0234804 A1 | 12/2003 | Parker et al. | |
| 2004/0034865 A1 | 2/2004 | Barrett et al. | |
| 2004/0043819 A1 | 3/2004 | Willis | |
| 2004/0094194 A1 | 5/2004 | Aldoretta et al. | |
| 2004/0097288 A1 | 5/2004 | Sloate et al. | |
| 2004/0110469 A1 * | 6/2004 | Judd et al. | 455/15 |
| 2004/0121648 A1 | 6/2004 | Voros | |
| 2004/0125820 A1 * | 7/2004 | Rios | 370/480 |
| 2004/0203694 A1 | 10/2004 | Wong et al. | |
| 2004/0204102 A1 | 10/2004 | Kuehnel et al. | |
| 2005/0286448 A1 * | 12/2005 | Proctor et al. | 370/279 |
| 2006/0098592 A1 | 5/2006 | Proctor Jr. et al. | |
| 2006/0183421 A1 * | 8/2006 | Proctor et al. | 455/11.1 |

FOREIGN PATENT DOCUMENTS

| | | | |
|---|---|---|---|
| EP | 1202472 A2 * | 5/2002 | |
| JP | 2001111575 | 4/2001 | |
| JP | 2001244864 | 9/2001 | |
| WO | WO 00/50971 | 8/2000 | |
| WO | WO 02/071664 | 9/2002 | |
| WO | WO 02/078369 A1 | 10/2002 | |
| WO | WO 03032666 A1 * | 4/2003 | |

OTHER PUBLICATIONS

Jack Boulware, "Power Houses", Wired Nov. 2002, Issue 10.11, (electronic copy, 11 pages), Wired Digital, Inc., US.

* cited by examiner

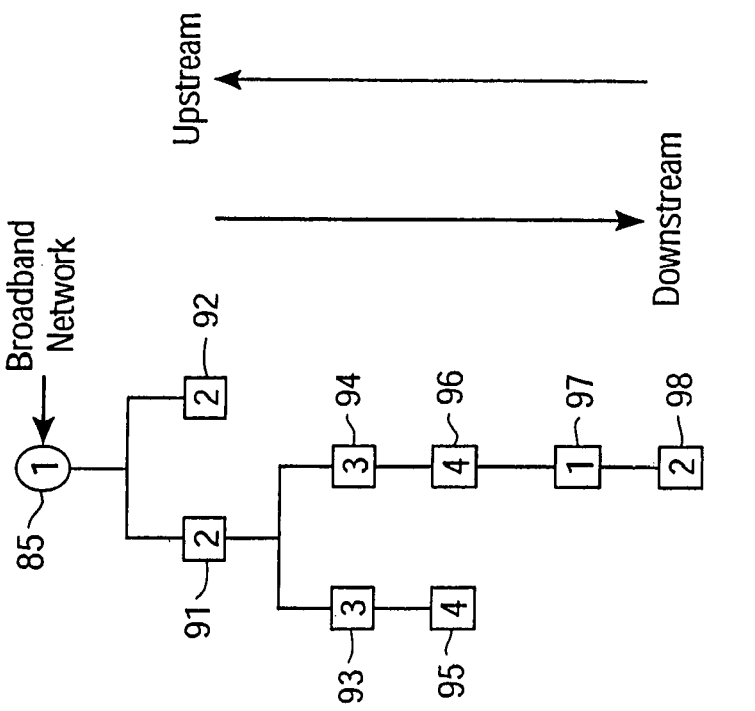
FIG. 14C
1st Floor
Repeater Topology
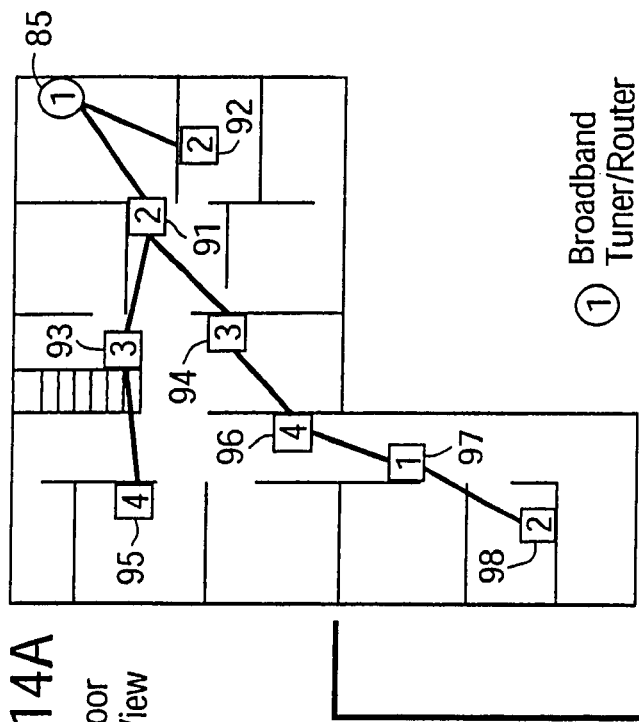
FIG. 14A
1st Floor
Plan View
FIG. 14B
Side Elevation View

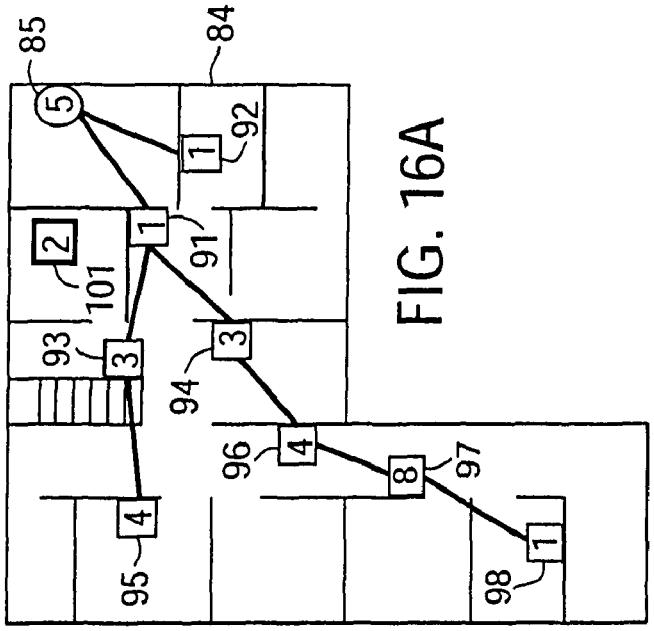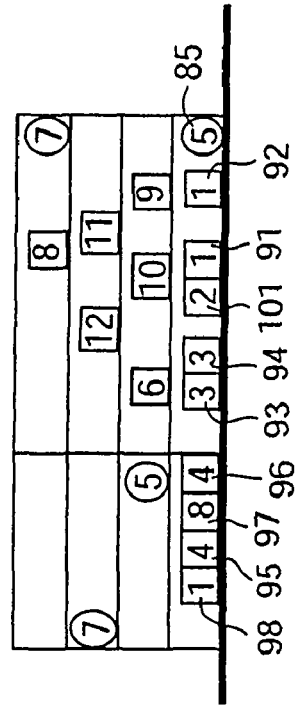
FIG. 16A
FIG. 16B
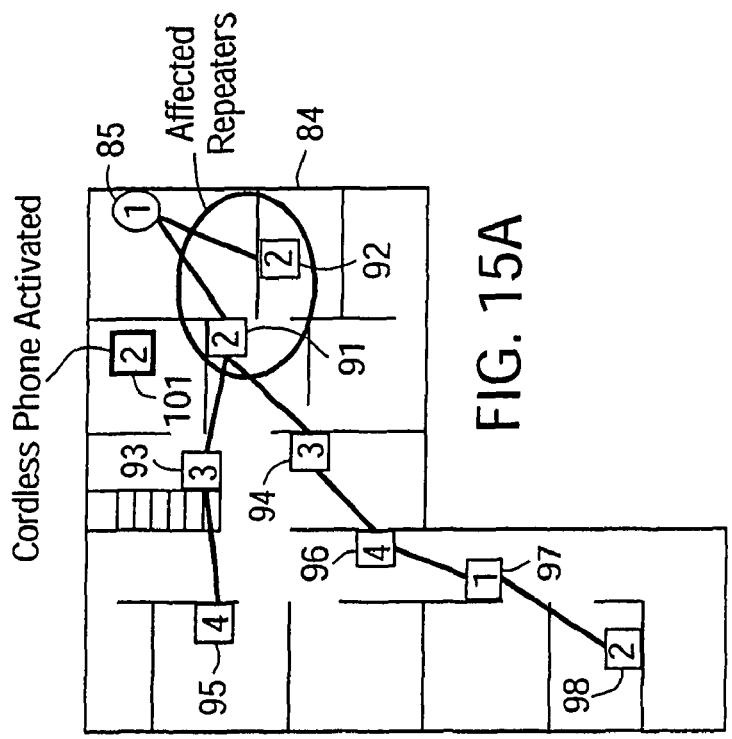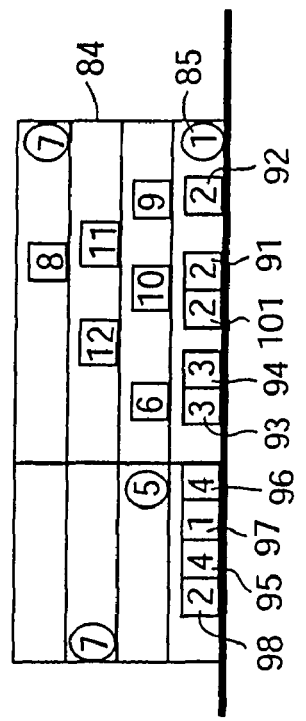
FIG. 15A
FIG. 15B

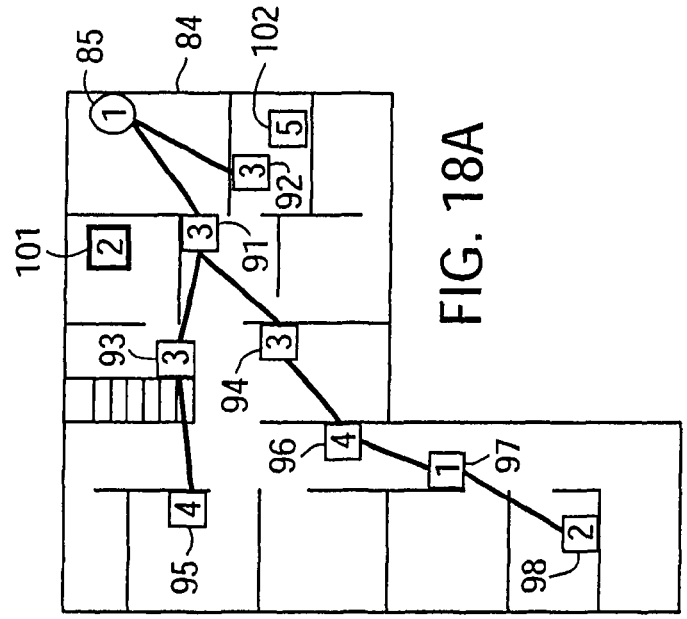
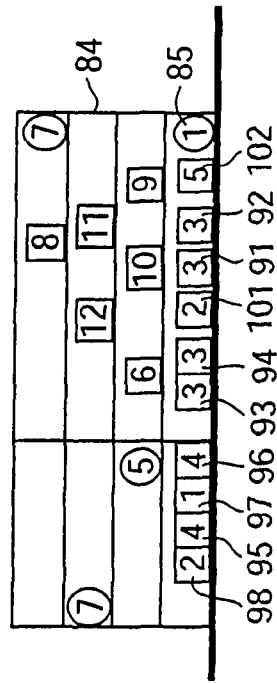
FIG. 18A
FIG. 18B
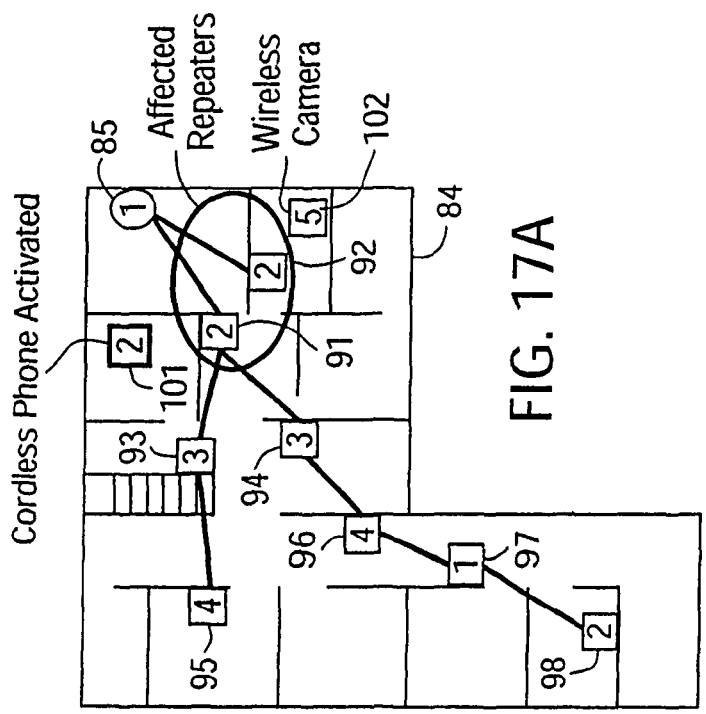
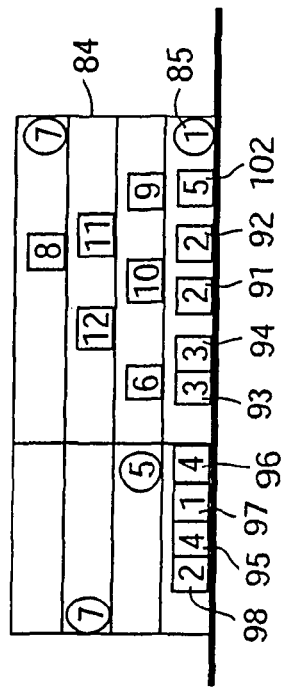
FIG. 17A
FIG. 17B

SELF-CONFIGURING, ADAPTIVE, THREE-DIMENSIONAL, WIRELESS NETWORK

RELATED APPLICATIONS

This application is a continuation of Ser. No. 10/367,197 filed Feb. 14, 2003, now U.S. Pat. No. 7,590,084, issued Sep. 15, 2009, which application is related to application Ser. No. 10/367,178, filed Feb. 14, 2003, now U.S. Pat. No. 7,593,361, issued Sep. 22, 2009; Ser. No. 10/619,919, filed Jul. 15, 2003, now U.S. Pat. No. 7,715,336, issued May 11, 2010; Ser. No. 10/608,594, filed Jun. 27, 2003; Ser. No. 10/889,326, filed Jul. 12, 2004; and Ser. No. 12/070,759, filed Feb. 21, 2008.

FIELD OF THE INVENTION

The present invention relates generally to wireless networks, and more particularly to methods and apparatus for configuring, expanding and maintaining a wireless network for home or office use.

BACKGROUND OF THE INVENTION

In recent years, wireless networks have emerged as flexible and cost-effective alternatives to conventional wired local area networks (LANs). At the office and in the home, people are gravitating toward use of laptops and handheld devices that they can carry with them while they do their jobs or move from the living room to the bedroom. This has led industry manufacturers to view wireless technologies as an attractive alternative to Ethernet-type LANs for home and office consumer electronics devices, such as laptop computers, Digital Versatile Disk ("DVD") players, television sets, and other media devices. Furthermore, because wireless networks obviate the need for physical wires, they can be installed relatively easily.

Wireless communication systems adapted for use in homes and office buildings typically include an access point coupled to an interactive data network (e.g., Internet) through a high-speed connection, such as a digital subscriber line (DSL) or cable modem. The access point is usually configured to have sufficient signal strength to transmit data to and receive data from remote terminals or client devices located throughout the building. For example, a portable computer in a house may include a PCMCIA card with a wireless transceiver that allows it to receive and transmit data via the access point. Data exchanged between wireless client devices and access points is generally sent in packet format. Data packets may carry information such as source address, destination address, synchronization bits, data, error correcting codes, etc.

A variety of wireless communication protocols for transmitting packets of information between wireless devices and access points have been adopted throughout the world. For example, in the United States, IEEE specification 802.11 and the Bluetooth wireless protocol have been widely used for industrial applications. IEEE specification 802.11, and Industrial, Scientific, and Medical (ISM) band networking protocols typically operate in the 2.4 GHz or 5 GHz frequency bands. In Europe, a standard known as HIPERLAN is widely used. The Wireless Asynchronous Transfer Mode (WATM) standard is another protocol under development. This latter standard defines the format of a transmission frame, within which control and data transfer functions can take place. The format and length of transmission frames may be fixed or dynamically variable.

Although traditional wireless networks work fairly well for residential Internet traffic running at data rates below 1 megabit per second (Mbps), transmission of high-bandwidth video programs is more problematic due to the much faster video data rates. High-bandwidth data transmissions can be degraded by the presence of structural obstacles (e.g., walls, floors, concrete, multiple stories, etc.), large appliances (e.g., refrigerator, oven, furnace, etc.), human traffic, conflicting devices (e.g., wireless phones, microwave ovens, neighboring networks, X10 cameras, etc.), as well as by the physical distance between the access point and the mobile terminal or other device. By way of example, an IEEE 802.11b compliant wireless transceiver may have a specified data rate of 11.0 megabits per second (Mbps), but the presence of walls in the transmission path can cause the effective data rate to drop to about 1.0 Mbps or less. Degradation of the video signal can also lead to repeated transmission re-tries, causing the video image to appear choppy. These practical limitations make present-day wireless technologies one of the most unreliable of all the networking options available for home media networks.

One proposed solution to this problem is to increase the number of access points in the home, with the various access points being interconnected by a high-speed cable wire. The drawback of this approach, however, is that it requires that cable wires be routed through the interior of the structure.

An alternative solution is to utilize wireless repeaters to extend coverage of the network throughout the building. For example, D-Link Systems, Inc., of Irvine, Calif. manufactures a 2.4 GHz wireless product that can be configured to perform either as a wireless access point, as a point-to-point bridge with another access point, as a point-to-multi-point wireless bridge, as a wireless client, or as a wireless repeater. As a wireless repeater, the product functions to re-transmit packets received from a primary access point. But the problem with these types of wireless repeaters is that they retransmit at the same frequency as the primary access point device. Consequently, because the primary access point and repeaters share the same channel, the bandwidth of the network is effectively reduced for each repeater installed. For example, if a data packet needs to be repeated (i.e., re-transmitted) three times in the same channel, each packet must wait until the previous packet has been repeated which means that the resulting bandwidth loss is 67%. So if the initial video transmission starts out at, say, 21 Mbps, the effective payload data rate at the receiver end is diminished to about 7 Mbps. Naturally, with more repeaters, more data hops are required, so the bandwidth loss becomes worse. This approach basically trades-off bandwidth for signal range—extending the range of the wireless network, but sacrificing valuable bandwidth in the process.

Still another attempted solution to the problem of wireless transmission of video data is to lower the bandwidth of the video through data compression. This technique involves compressing the video data prior to transmission, then decompressing the data after it has been received. The main drawback with compression/decompression techniques is that they tend to compromise the quality of the video image, which is unacceptable to most viewers. This approach also suffers from the problem of lost connections during transmission.

In view of the aforementioned shortcomings, there exists a strong need for a highly reliable wireless network (e.g., on a par with coaxial cable) that provides very high data rates (e.g., 30 Mbps) throughout the full coverage range of a home or building.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIGS. 14A & 14B show a plan view and a side elevation view, respectively, of a floor plan for a building installed with a wireless network according to one embodiment of the present invention.

FIG. 14C illustrates the repeater topology for the first floor shown in FIGS. 14A & 14B.

FIGS. 15A & 15B show plan and side elevation views, respectively, of the wireless network of FIGS. 14A & 14B, but with a disturbance.

FIGS. 16A & 16B illustrate the network of FIGS. 15A and 15B after reconfiguration to overcome the disturbance.

FIGS. 17A & 17B illustrate another example of channel conflict in a wireless network implemented according to one embodiment of the present invention.

FIGS. 18A & 18B illustrate the network of FIGS. 17A and 17B after channel reconfiguration.

DETAILED DESCRIPTION

The present invention is a self-configuring, adaptive wireless local area network (WLAN) that utilizes cellular techniques to extend the range of transmission without degrading bandwidth. The wireless network of the present invention is thus ideally suited for transmitting video programs (e.g., digitally-encoded video broadcast services, pay-per-view television, on-demand video services, etc.) throughout a house or other building, thereby creating a "media-live" environment.

In the following description numerous specific details are set forth, such as frequencies, circuits, configurations, etc., in order to provide a thorough understanding of the present invention. However, persons having ordinary skill in the communication arts will appreciate that these specific details may not be needed to practice the present invention. It should also be understood that the basic architecture and concepts disclosed can be extended to a variety of different implementations and applications. Therefore, the following description should not be considered as limiting the scope of the invention.

Figure 1:
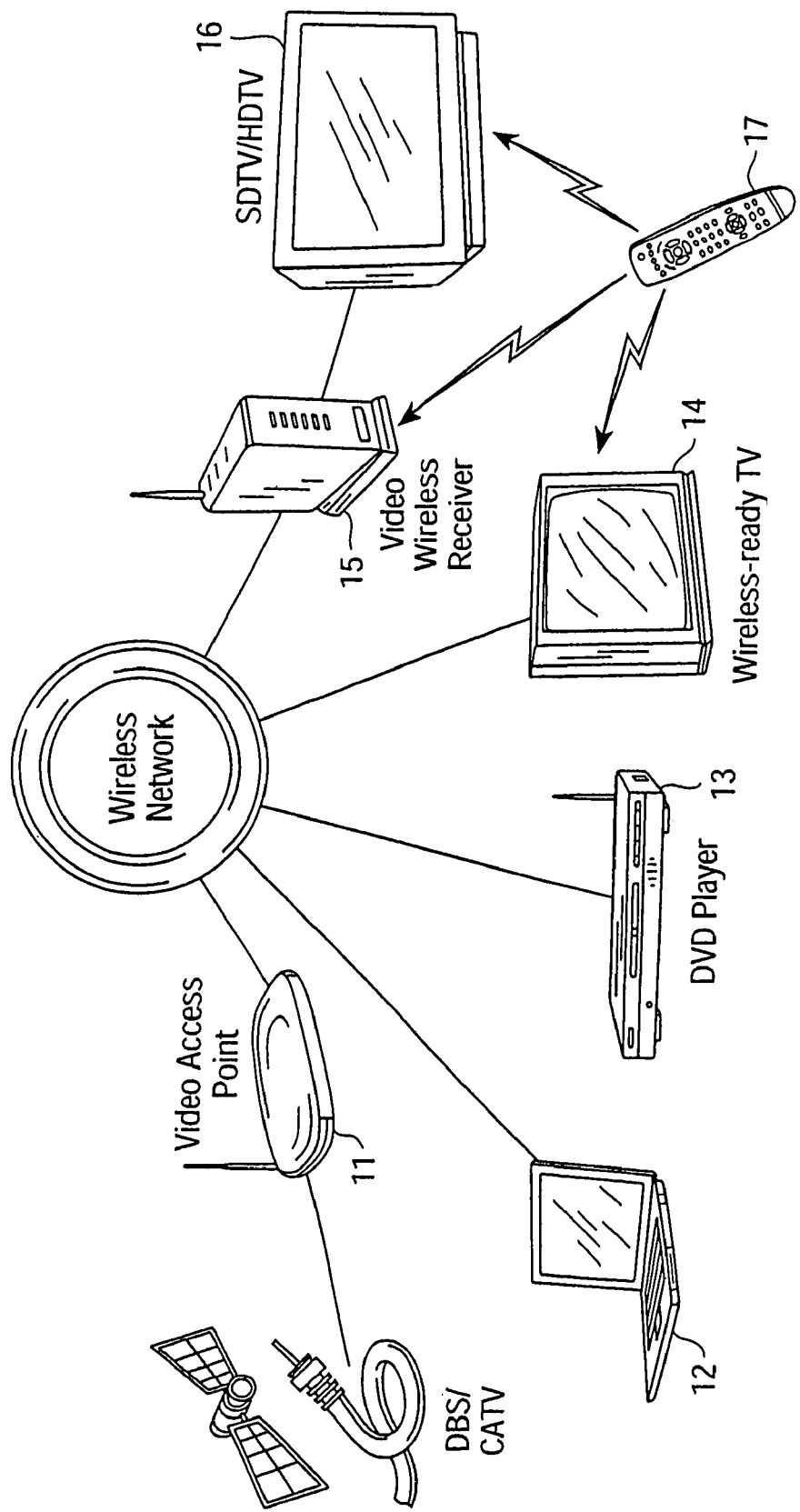
FIG. 1 is a conceptual diagram of a wireless network according to one embodiment of the present invention.

With reference to FIG. 1, a wireless home media network 10 according to one embodiment of the present invention comprises a source video access point 11 coupled to a broadband connection. By way of example, the broadband connection may provide video content from a Direct Broadcast Satellite (DBS) or digital cable service provider. Additional wireless access points (simply referred to as "access points" or "repeaters" in the context of the present application) may be physically located in a distributed manner throughout the home or building to provide connectivity among a variety of home media devices configured for wireless communications. As shown in FIG. 1, these home media devices may include a laptop personal computer 12, DVD player 13, wireless-ready television 14, and wireless-linked receiver 15 coupled to either a standard definition or high-definition television (SDTV/HDTV) 16. Other types of devices, such as personal digital assistants (PDAs), may also be coupled to network 10 for receiving and/or transmitting data. Practitioners in the art will appreciate that many client media devices such as personal computers, televisions, PDAs, etc., have the capability of detecting the operating frequency of the access point within a particular micro-cellular transmission range.

Commands for one or more of these home media devices may be generated using a remote control unit 17, either through infrared (IR) or radio frequency (RF) signals. In one embodiment, wireless network 10 provides reliable, full home coverage at throughputs supporting multiple simultaneous video streams, e.g., two HDTV streams at approximately 30 Mbps; eight SDTV streams at about 16 Mbps.

According to the present invention a plurality of access points is utilized in a wireless network to provide relatively short transmission ranges that preserve bandwidth and achieve high reliability. The wireless network of the present invention implements a three-dimensional ("3-D") topology in which communications between an access point and mobile terminals or client media devices in a particular region occur at a frequency which is different than the communication frequency of a neighboring region. In specific embodiments, the 2.4 GHz and 5 GHz frequency bands are utilized for wireless transmissions. In the United States, for instance, the 2.4 GHz band provides three non-overlapping channels, whereas the 5 GHz band provides twelve non-overlapping channels for simultaneous transmission traffic. The wireless network of the present invention achieves full range coverage in the home without bandwidth loss by utilizing a different channel for each data packet hop. This feature allows repeater data packets to overlap in time, as discussed in more detail below.

Figure 2B:
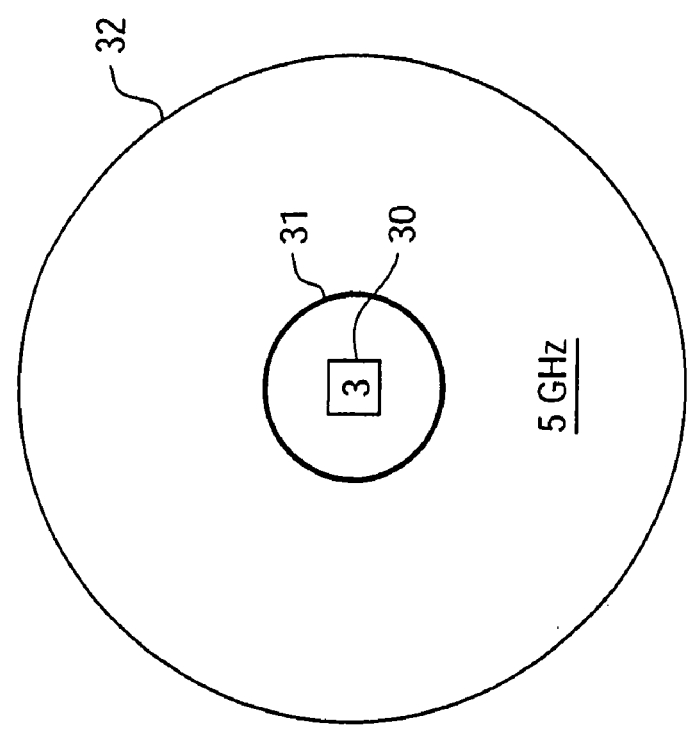
FIGS. 2A & 2B illustrate propagation characteristics for access points operating in the 2.4 GHz and 5 GHz frequency bands.
Figure 2A:
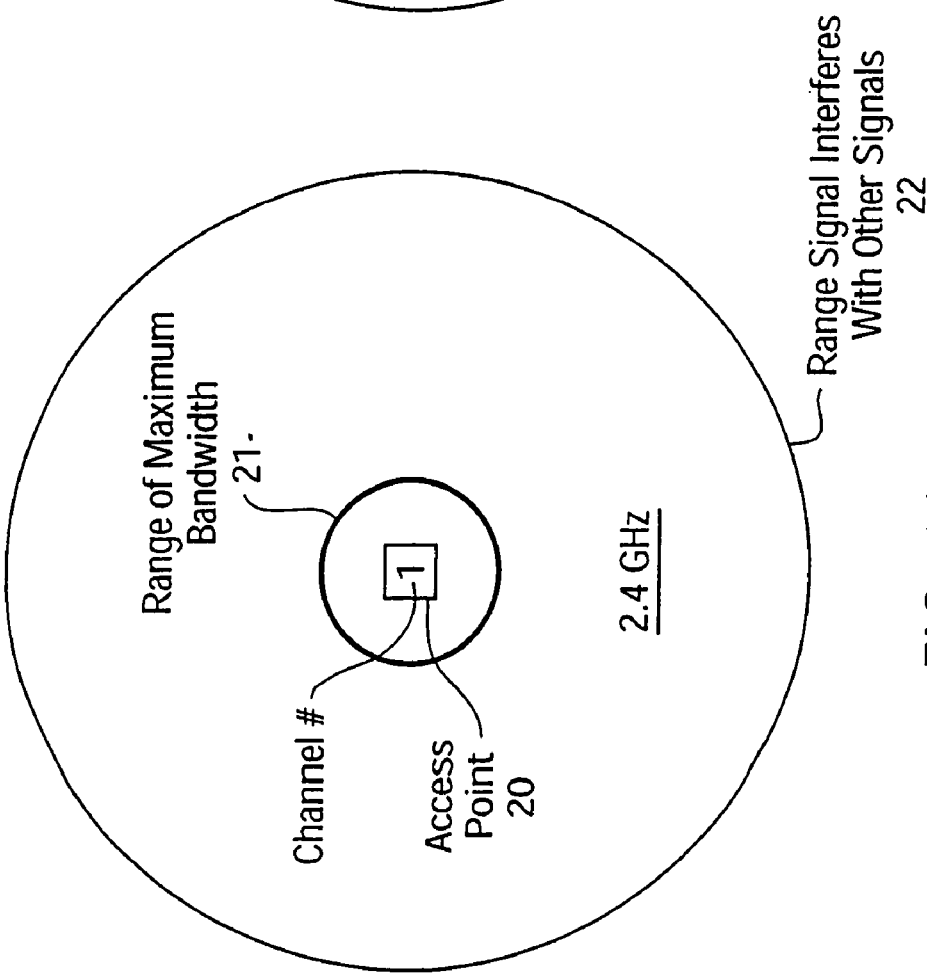

FIG. 2A is a diagram illustrating the two-dimensional propagation characteristics through open air associated with an access point 20 operating in the 2.4 GHz band and transmitting on a particular channel, i.e., channel 1. Inner circle 21 represents the range of maximum bandwidth, and outer circle 22 represents the range at which the signal from access point 20 ceases to interfere with other signals in the same channel. FIG. 2B shows an access point 30 operating in the 5 GHz band with maximum bandwidth and interference ranges represented by circles 31 and 32, respectively. As can be seen, both access points 20 and 30 have a relatively short range at maximum bandwidth, but have a fairly wide interfering signal range. Notably, access point 30 has a shorter interference range than access point 20.

Figure 3:
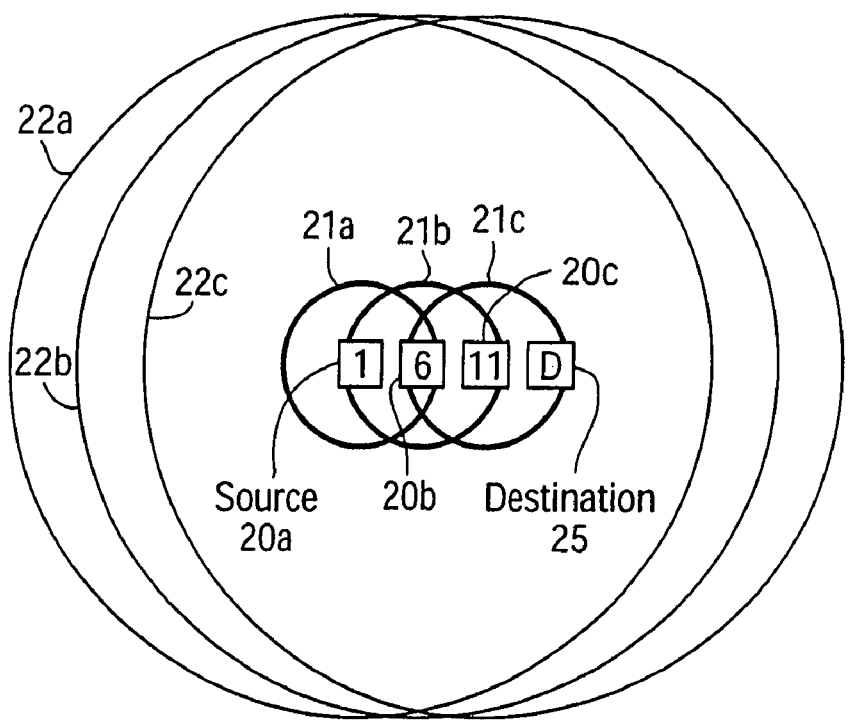
FIG. 3 is an example of wireless signal repeating in accordance with one embodiment of the present invention.

FIG. 3 is an example of wireless signal repeating in accordance with one embodiment of the present invention. In the embodiment of FIG. 3, each of the access points 20a-20c transmits on a different channel. For instance, access point 20a is shown operating on channel #1 in the 2.4 GHz band; access point 20b operates on channel #6; and access point 20c operates on channel #11 in the same band. The inner circles 21a-21c each denotes the ranges of maximum bandwidth associated with access points 20a-20c, respectively. (The outer circles 22a-22c denotes the same-channel interference signal range associated with access points 20a-20c, respectively.) As can be seen, each of the access points is advantageously located at a distance within the maximum bandwidth range of its nearest neighboring access point. Similarly, the destination media device 25 is disposed within the maximum bandwidth range of its nearest access point 20c.

In the example of FIG. 3, access points 20b and 20c function as signal repeaters to facilitate transmission of data from source access point 20a to destination device 25. To prevent loss of bandwidth during transmission, each of the access points 20a-20c repeats transmission of data packets on a different frequency channel than any of its neighboring access points within signal interference range. Access points located beyond the interference range of a channel may reuse that same channel. In this case, a source data packet 1 is transmitted by access point 20a on channel #1. Access point 20b repeats transmission of this data packet on channel #6. Access point 20c again repeats transmission of data packet 1; this time on channel #11. Destination media device 25 receives data packet 1 from access point 20c on channel #11.

Figure 4:
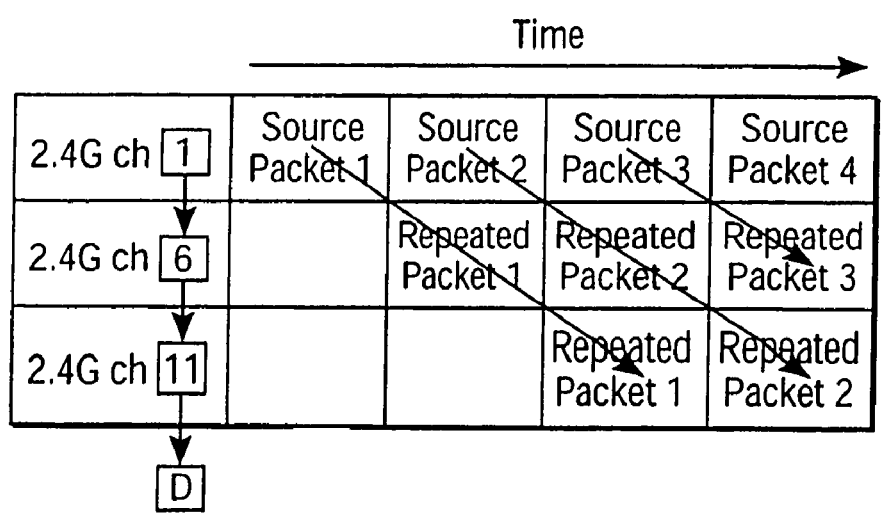
FIG. 4 is a chart illustrating pipelined data packet flow from source to destination in accordance with one embodiment of the present invention.

After the transmission of data packet 1, access point 20a may immediately transmit a second source data packet ("packet 2"), followed by a third source data packet, a fourth data packet, and so on. Each of these data packets are repeated across the network in a pipeline manner by access points 20b and 20c, as shown in FIG. 4. Pipelining of data packets across channels facilitates transmission of video data without loss of bandwidth. The wireless network of the present invention has no limitation on how far the transmission of data can extend, as long as there are a sufficient number of channels available.

In the 2.4 GHz band, three channels allows for three: hops in any direction (including the initial transmission from the source) in three-dimensional space at maximum bandwidth. Since each hop normally can extend about 50 feet at maximum bandwidth, three hops on three different channels (one source plus two repeaters) can cover a distance of about 150 feet from source to destination. In the license-free 5 GHz band (e.g., 5725 MHz to 5850 MHz), there are currently twelve channels with upwards of 54 Mbps of bandwidth available on each channel in good transmission conditions. As with the 2.4 GHz band, each hop in the 5 GHz band will typically extend about 50 feet at maximum bandwidth, but the large number of channels permits hops to extend indefinitely. That is, in a wireless network operating in the 5 GHz band according to the present invention, repeaters extend far enough for channel reuse. This means that hops can extend the range of transmission from source to destination without limitation.

Figure 5:
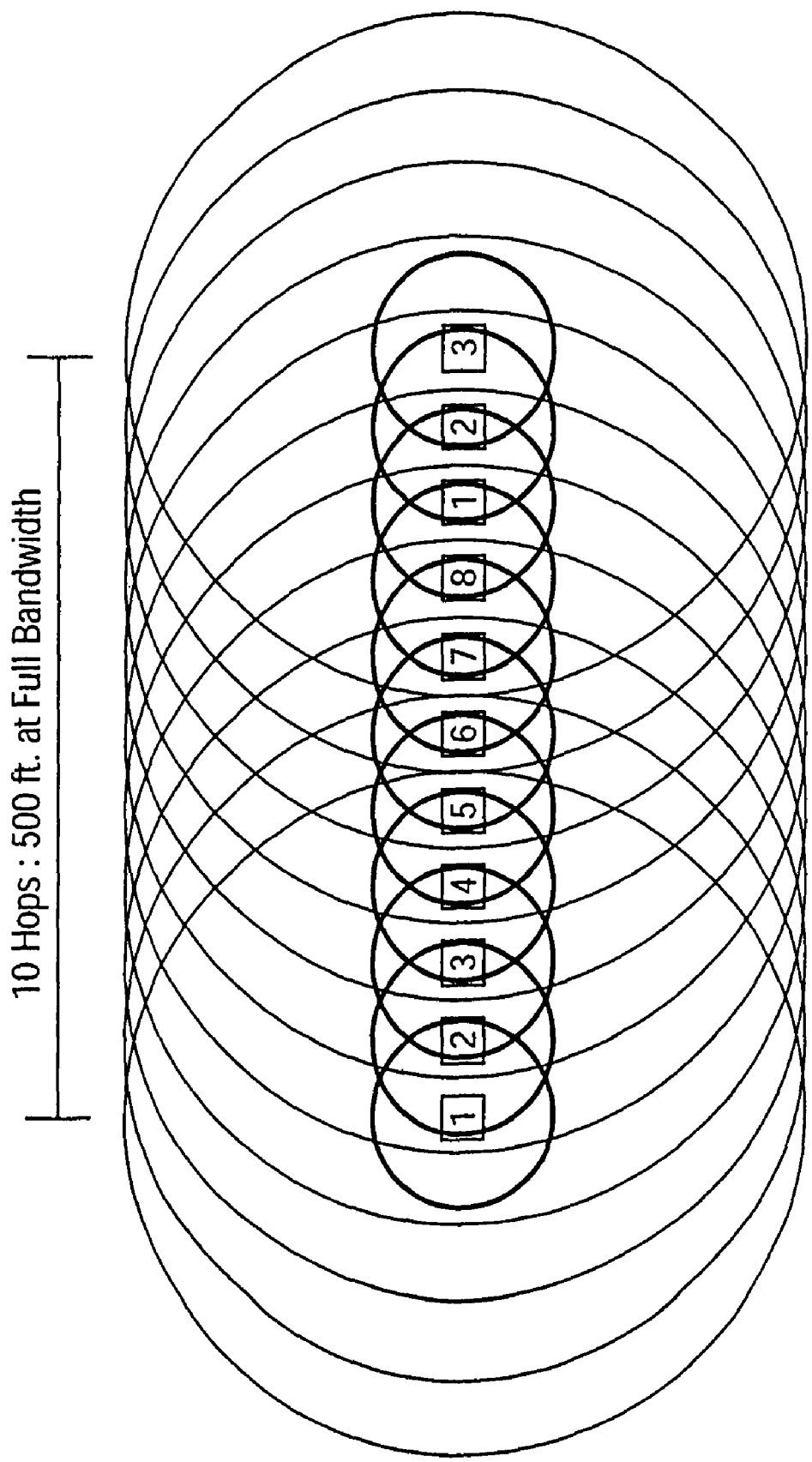
FIG. 5 is an example showing limitless data transmission range extension in accordance with another embodiment of the present invention.

FIG. 5 is an example showing a network configuration in which each hop extends about 50 feet, so that ten hops cover about 500 feet. In this example, after ten hops, any channel beyond its interference range may be reused. Note that the smaller inner circles representing the range of maximum bandwidth around the access points that operate on the same channel frequency (e.g., channel #1) are separated by a considerable distance (~400 feet). Note that each access point is shown spaced-apart from its nearest neighboring access point by a distance less than the maximum bandwidth range (i.e., small circle) of its nearest neighbor. At the same time, any two access points transmitting on the same channel are shown separated from each by a distance greater than the interference signal range. Access points that re-use the same channel are separated by a distance greater than their respective signal interference ranges. The large spatial separation between access points using the same frequency channel means that transmission problems due to channel interference between access points operating on the same channel are virtually nonexistent in the wireless network of the present invention.

Figure 6:
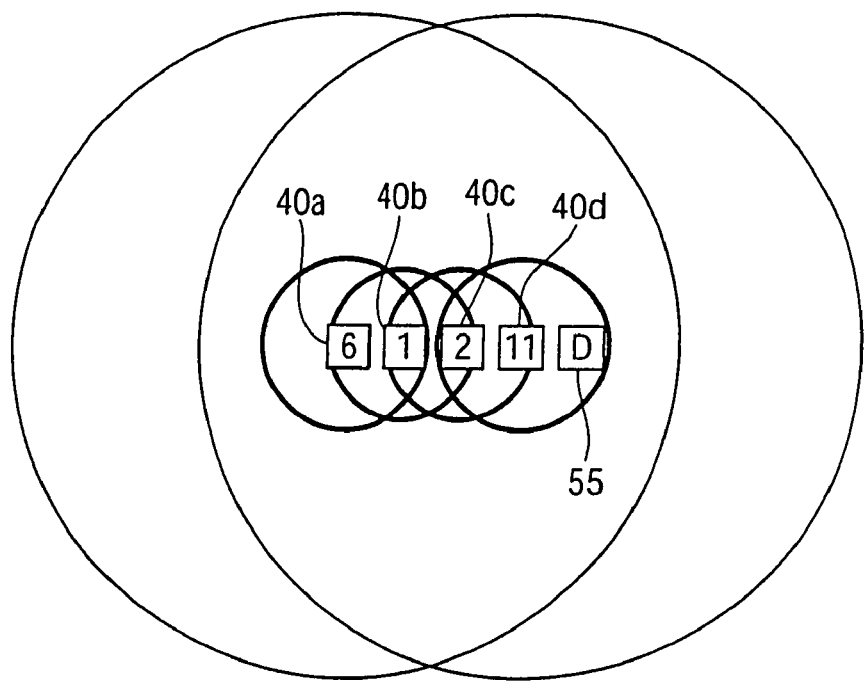
FIG. 6 is an example of wireless signal repeating for 2.4 GHz traffic utilizing a 5 GHz repeater backbone in accordance with another embodiment of the present invention.
Figure 7:
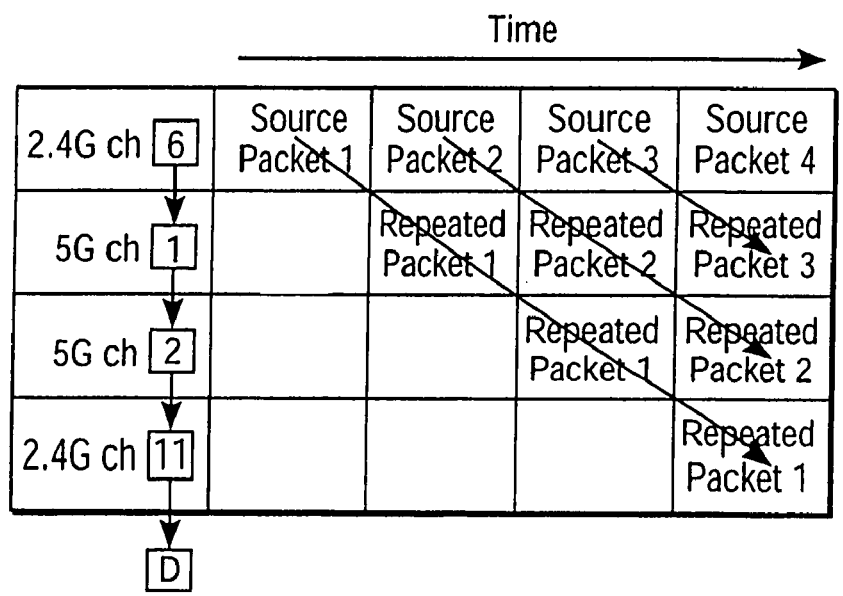
FIG. 7 is a chart illustrating pipelined data packet flow from source to destination in accordance with the embodiment of FIG. 6.

In addition to neighboring access points operating on different channels, different frequency bands may also be used during data transmission across the wireless network of the present invention. In an alternative embodiment, for instance, 5 GHz repeaters may be utilized to form an arbitrary length backbone for 2.4 GHz data traffic. This situation is illustrated in the example of FIGS. 6 & 7, which shows source access point 40a transmitting data packets to a 2.4 GHz destination 55 using 5 GHz repeaters 40b & 40c. Note that source point 40a and repeater 40d (transmitting to destination device 55) both operate in the 2.4 GHz band, but utilize different channels, i.e., channels #6 and #11, respectively, to prevent bandwidth loss.

Another possibility is to use a 5 GHz device at the destination and a 2.4 GHz access point at the source or vice-versa. As long as the network is configured for communications with source-to-destination frequency band transitions of 2.4 GHz to 5 GHz, or 5 GHz to 2.4 GHz, or 2.4 GHz to 2.4 GHz on different channels (all utilizing 5 GHz for repeaters in-between), the network can provide an arbitrary length backbone for 2.4 gigahertz traffic, despite the fact there are only three 2.4 GHz channels available. In other words, the wireless network of the present invention is not limited to data transmissions confined to a single frequency band.

Figure 8:
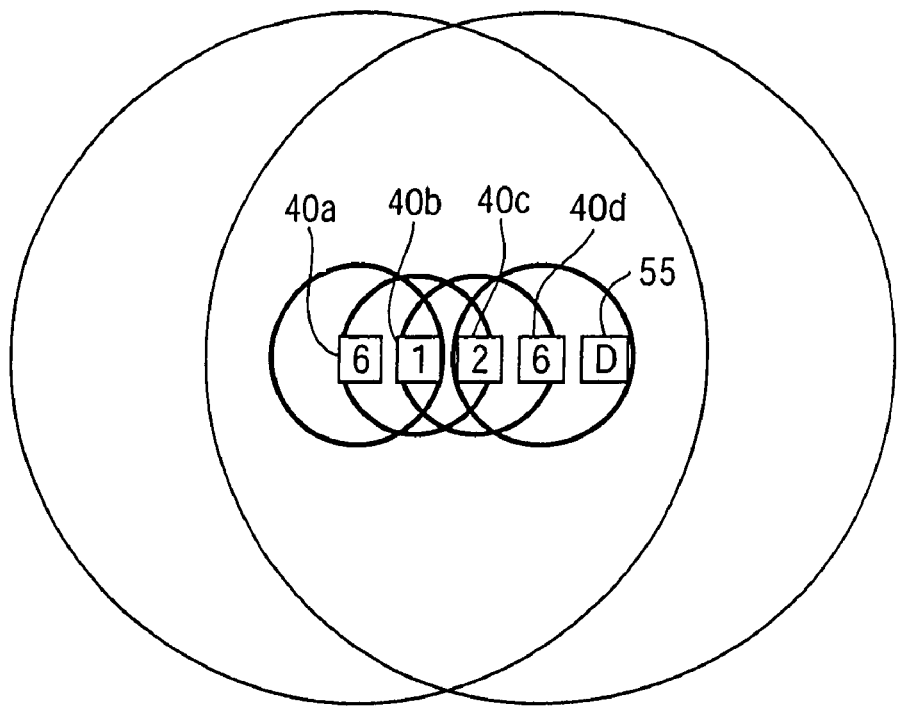
FIG. 8 is an example of wireless signal repeating for 2.4 GHz traffic utilizing a 5 GHz repeater backbone, with the source and destination on the same channel in accordance with yet another embodiment of the present invention.
Figure 9:
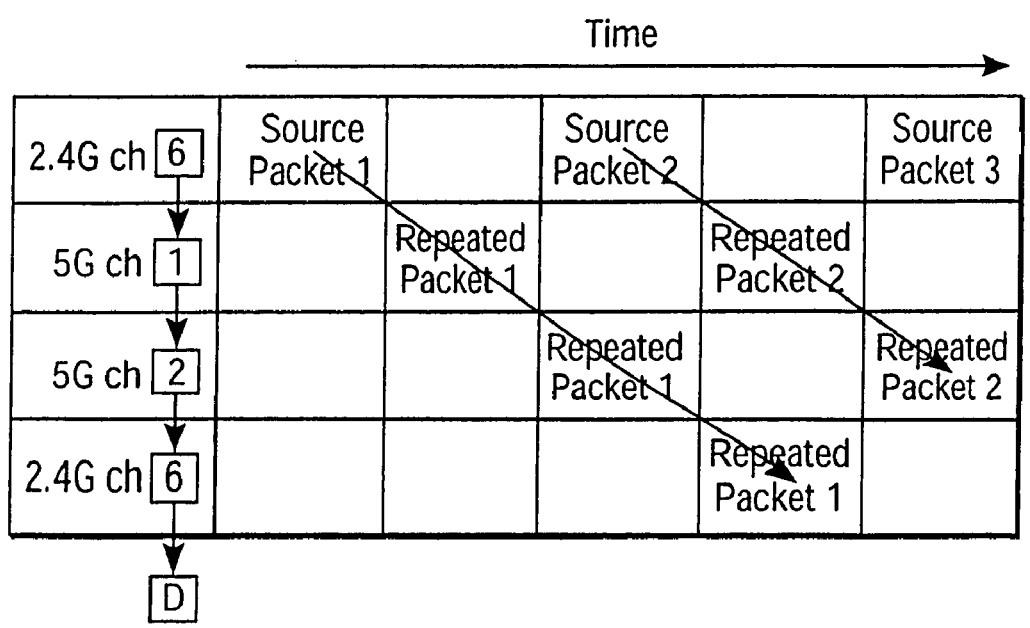
FIG. 9 is a chart illustrating pipelined data packet flow from source to destination in accordance with the embodiment of FIG. 8.

It is also possible to configure a wireless network in accordance with the present invention where the source and destination devices both operate at 2.4 GHz using the same channel. Such an embodiment is shown in the conceptual diagram of FIG. 8 and the associated transmission chart of FIG. 9, wherein source access point 40a and repeater 40d associated with destination media device 55 both operate in the 2.4 GHz band on channel #6. Repeaters 40b and 40c operate in the 5 GHz band on channel #1 and #2, respectively. Although this particular embodiment has a penalty of 50% bandwidth loss, the network still may be extended to arbitrary length with no additional bandwidth loss, regardless of the total distance covered. It is appreciated that the 50% bandwidth loss in this embodiment results from the need to stagger the data packet transmissions, as shown in the chart of FIG. 9, to avoid interference between the packet transmission by access point 40a and the packet transmission by repeater 40d.

Figure 10:
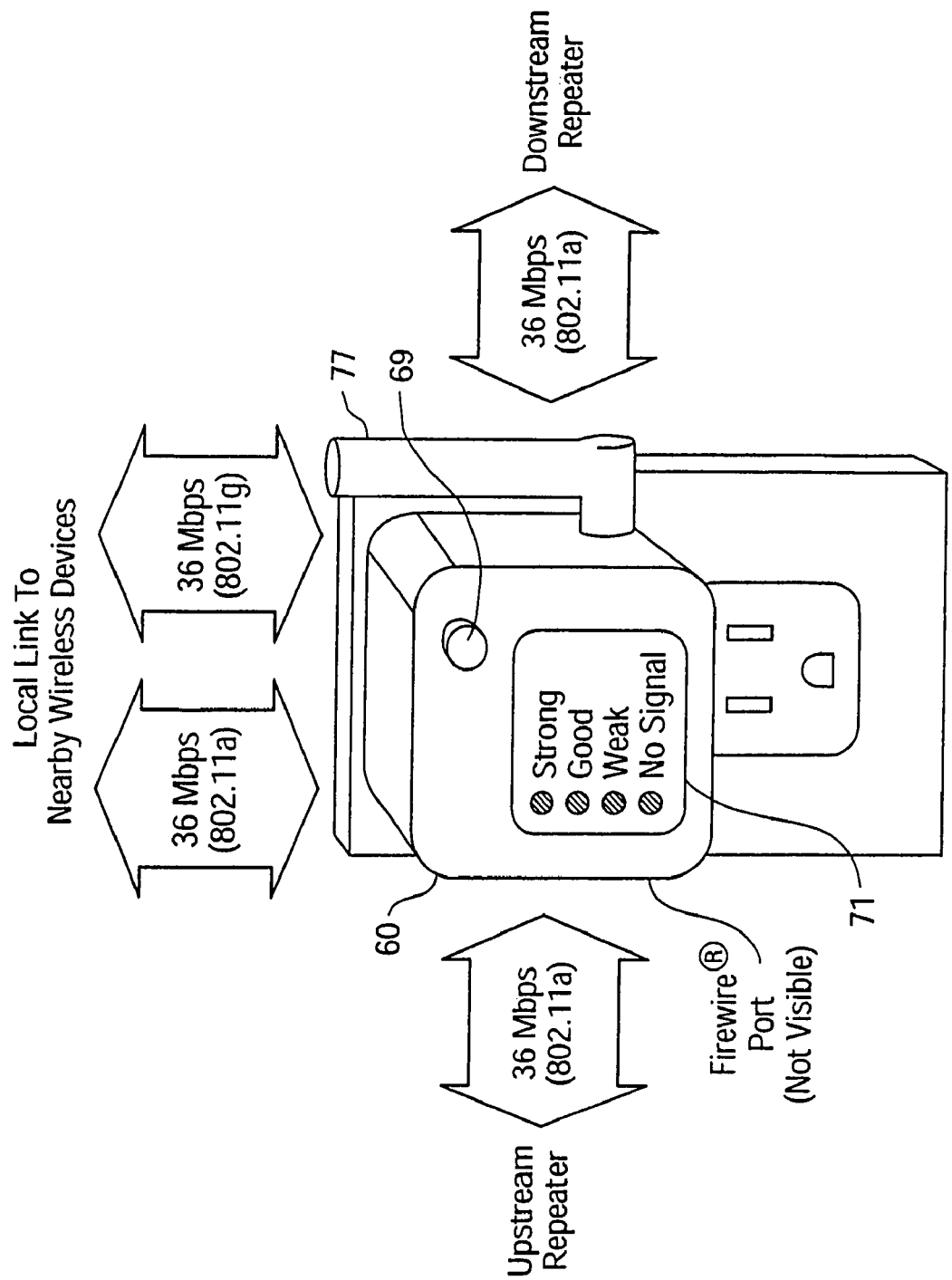
FIG. 10 is a perspective view of a wireless repeater in accordance with one embodiment of the present invention.
Figure 11:
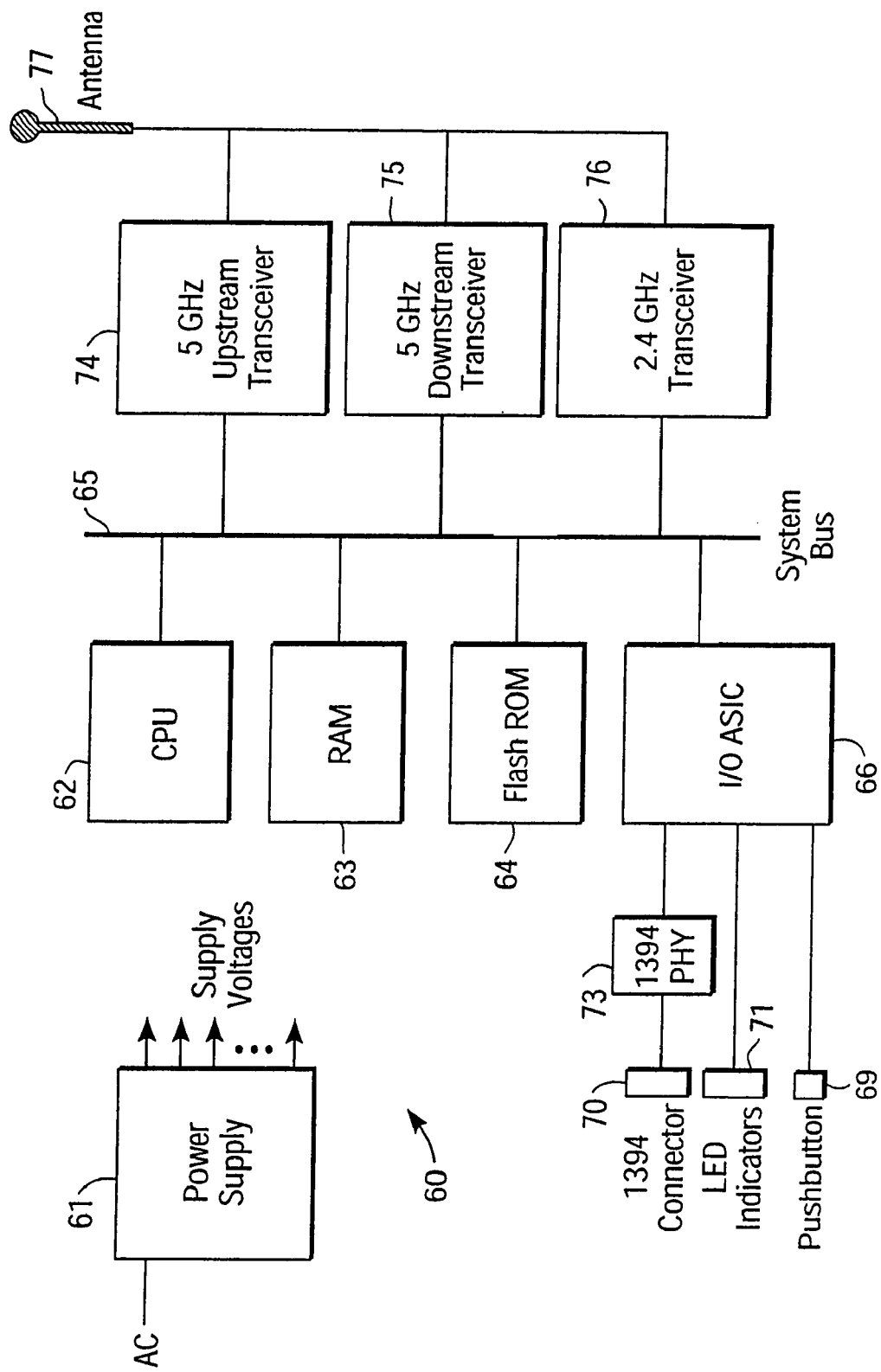
FIG. 11 is a circuit block diagram of the internal architecture of the wireless repeater shown in FIG. 10.

With reference now to FIG. 10, there is shown a perspective view of a wireless repeater unit 60 configured for installation in an ordinary electrical outlet in accordance with one embodiment of the present invention. FIG. 11 is a circuit block diagram of the internal architecture of repeater unit 60. Repeater unit 60 comprises a transformer/power supply 61 that provides supply voltages to the various internal electronic components, which include a CPU 62, a RAM 63, a Flash ROM 64, and input/output application specific integrated circuitry (I/O ASIC) 66, each of which is shown coupled to a system bus 65. Also coupled to system bus 65 are a plurality of transceivers, which, in this particular embodiment, include a 5 GHz "upstream" transceiver 74, a 5 GHz "downstream" transceiver 75, and a 2.4 GHz transceiver 76. Each of transceivers 74-76 is coupled to an antenna 77. Additional transceivers operating at different frequencies may be included in repeater unit 60.

CPU 62 controls the re-transmission of the received data packets, utilizing RAM 63 for both program execution, and for buffering of the packets as they are received from the upstream side, i.e., nearest the source, before they are sent out to the downstream side, i.e., toward the destination. Flash ROM 64 may be used to hold software and encryption key information associated with secure transmissions, for example, to insure that the network users are authorized users of satellite or cable subscriber services.

In the embodiment of FIG. 11, a 1394 connector interface 70 provides a Firewire® port (coupled through a 1394 PHY physical interface 73) to I/O ASIC 66. Also coupled to I/O ASIC 66 is a pushbutton switch 69 and an LED indicator panel 71. Pushbutton switch 69 may be utilized in conjunction with interface 70 to authenticate repeater unit 60 for use in the network after the wireless receiver or source access point has been initially installed. These aspects of the present invention will be described in more detail below.

By way of example, FIG. 10 further shows that the upstream repeater in the network comprises a wireless transceiver that operates in compliance with IEEE specification 802.11a to run with an effective throughput of 36 Mbps utilizing large packets of approximately 2500 bytes each. Persons of skill in the art will understand that IEEE 802.11a is a standard that permits use at more than one channel at a time. On the downstream side is another repeater that comprises a 5 GHz band, 802.11a wireless transceiver that operates on a different frequency channel. It should be understood that the present invention is not limited to these particular transceiver types or frequency bands. Other embodiments may utilize other types of transceivers; for instance, transceivers that operate in compliance with specifications that are compatible with IEEE specification 802.11a, 802.11b, or 802.11g, or which otherwise provide for wireless transmissions at high-bandwidths. For the purposes of the present application, IEEE specification 802.11a, 802.11b, 802.11g, and Industrial, Scientific, and Medical (ISM) band networking protocols are denoted as "802.11x".

Other non-ISM bands wireless network protocols could be utilized as well. For example, instead of utilizing 802.11a transceivers in the 5 GHz band, the network of the present invention could be implemented using transceivers compatible with HIPERLAN2, which runs with an effective throughput of about 42 Mbps.

Figure 12:
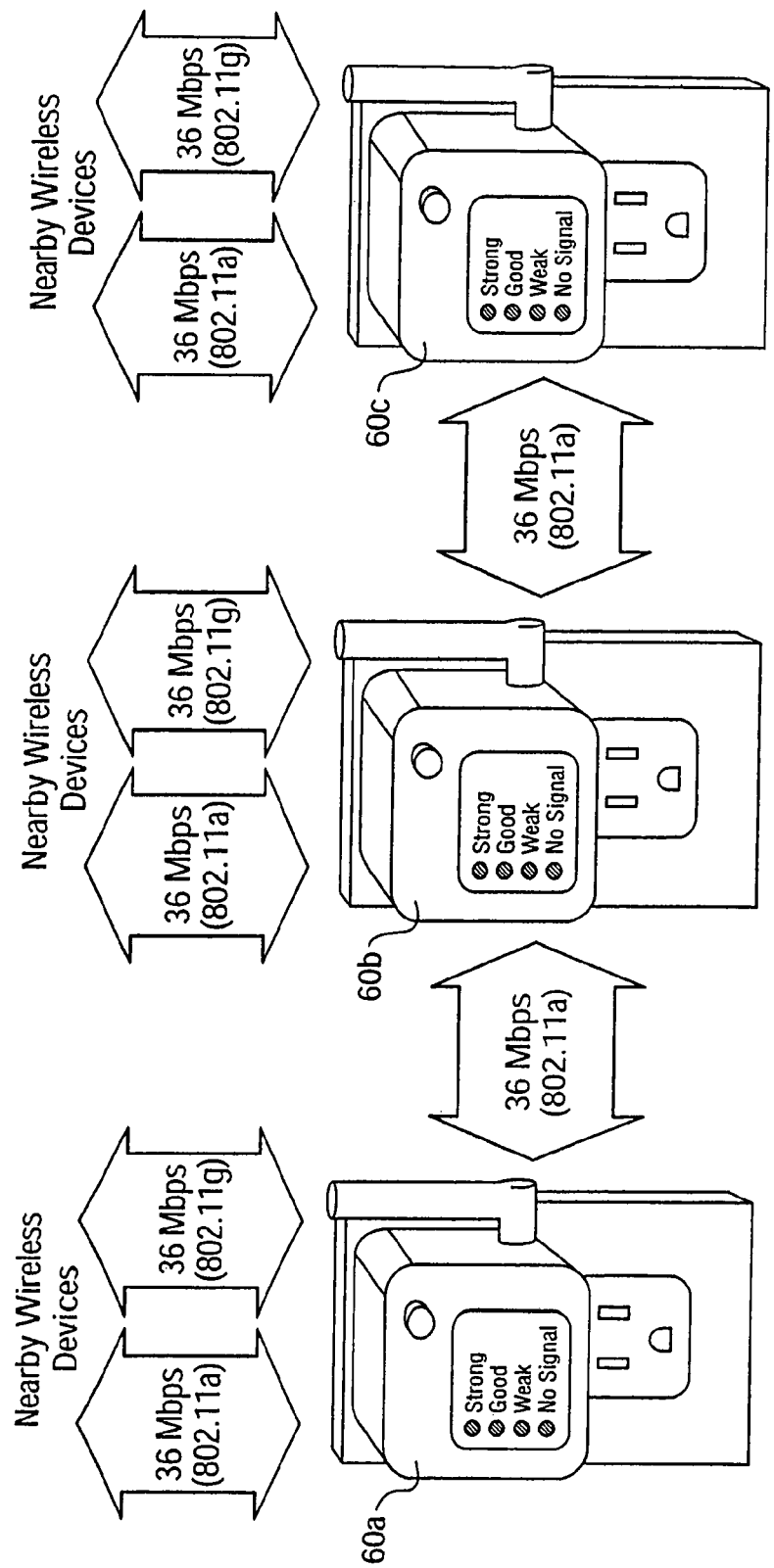
FIG. 12 illustrates three repeaters configured in a wireless network according to one embodiment of the present invention.

Transmissions between repeater unit 60 and client wireless media devices located nearby are shown at the top of FIG. 10. In this example, a 36 Mbps effective throughput link is provided through an 802.11g 2.4 GHz transceiver that may be used to connect to any local devices operating in the 2.4 GHz band. An 802.1a compatible transceiver may also be utilized to connect to local media devices operating in the 5 GHz band. In a network configured with multiple wireless repeaters, each wireless repeater may provide wireless communications to one or more local devices. FIG. 12, for example, illustrates three repeaters 60a-60c configured in a network wherein each repeater may provide a communication link to nearby wireless devices, such as laptop computers or wireless televisions, etc. Thus, by properly distributing repeater units throughout a home or office building, media content may be delivered at high bandwidths to client devices located anywhere in the home or office environment.

Repeater units 60 may be installed in the wireless network of the present invention after the source access point (e.g., source video receiver) has been made operational. In one embodiment, a new repeater unit 60 is first connected to the source access point or an existing repeater (one that is already plugged into an outlet and coupled to the wireless network) using a Firewire cable. The Firewire cable is connected between the existing repeater or source access point and the new repeater. Power is provided over the Firewire cable from the existing repeater or access point to the new repeater to activate the internal circuitry of the new repeater, so that encryption key information may be exchanged to allow the new repeater to securely connect to the network. Execution of program instructions for the exchange of encryption information may be initiated by the person performing the installation pressing pushbutton switch 69, located on the front side of repeater unit 60 in FIG. 10.

After the exchange of encryption information has completed, the Firewire cable between the two devices may be disconnected. The repeater unit with the newly activated encryption key may then be plugged into an electrical outlet in any location of the home or building where the user wants the network to extend.

Once repeater unit 60 is plugged in, it immediately outputs an indication of received signal strength on LED indicator panel 71. LED indicator panel 71 provides an indication of transmission signal strength to the upstream receiver, and may be advantageously used to locate repeater unit 60 to extend the network in a home or building. If, for example, the LED output indicates a strong signal, the installer may wish to remove the repeater unit from its present wall outlet location to a location farther away from the nearest existing repeater or access point. If, upon moving to a new location, LED indicator panel 71 outputs a "weak" or a "no signal" reading, this means, that the new repeater is too far away from existing connection points of the network. In either case, the installer should move the repeater unit back closer to an existing repeater or access point until a "good" or "strong" signal strength is indicated.

Another option is to provide an audio indication of the transmission signal quality, instead of a visual indication.

Once the source access point (e.g., video receiver) detects the presence a newly-activated repeater unit, it automatically self-configures the cellular repeater wireless network. This aspect of the present invention will be explained in greater detail below.

Figure 13:
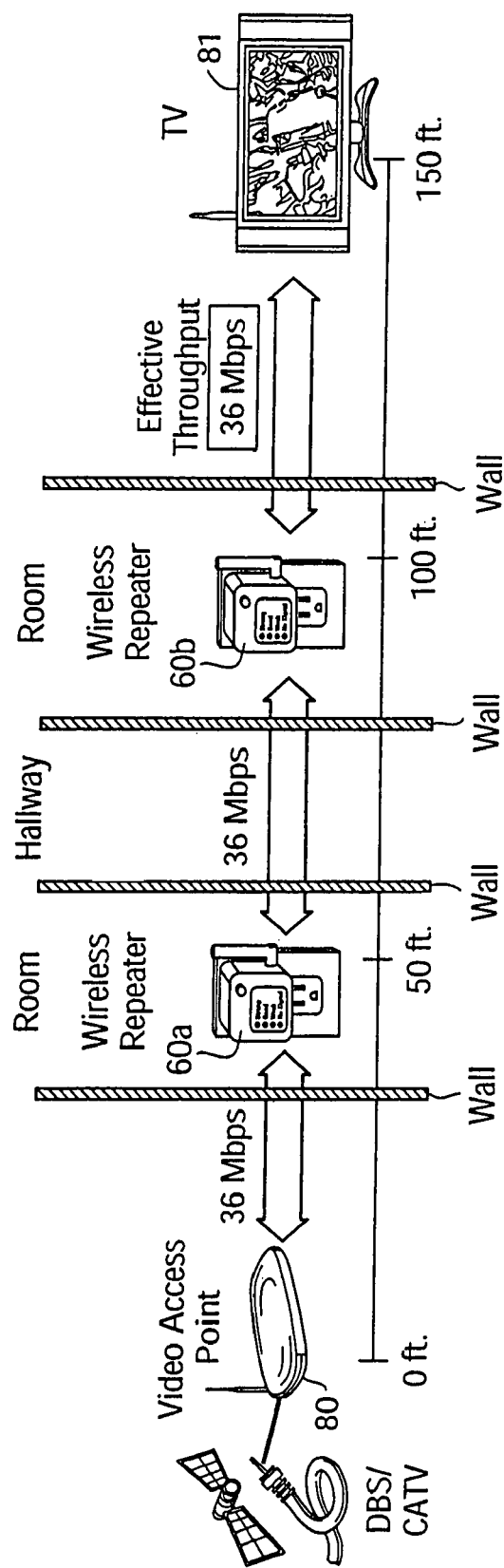
FIG. 13 is a diagram that shows the unlimited range at full bandwidth range of one embodiment of the present invention.

The example network shown in FIG. 13 illustrates the unlimited range at full bandwidth feature of one embodiment of the present invention. In FIG. 13, a video access point 80 is shown running at 36 Mbps to transmit information and video data downstream to a destination television 81 containing a wireless receiver located in a distant room. The video data may originate from a data service connection, such as a Direct Broadcast Satellite (DBS), DSL, or cable television (CATV), provided to access point 80. Repeaters 60a and 60b function as intermediary access points to distribute the video content to client media devices in their local vicinity, and to repeat downstream data packets received on the upstream side. As can be seen, each repeater transmits at 36 Mbps so the effective throughput received at destination television 81 remains at 36 Mbps, i.e., without bandwidth loss.

FIGS. 14A & 14B show a plan view and a side elevation view, respectively, of a floor plan of a building 84 installed with four separate, secure wireless networks according to one embodiment of the present invention. FIG. 14C illustrates the repeater topology for the network installed on the first floor plan shown in FIGS. 14A & 14B. Source access points (e.g., video tuners or data routers) in building 84 are denoted by circles, with the number inside the circle designating the frequency channel used. Additional access points (i.e., repeaters) are denoted by squares, with the number inside the square similarly designating the channel used for signal transmissions. In the example of FIGS. 14A-14C, four source access points 85-88 are each shown connected to a broadband network (e.g., cable, DSL, etc.), with each source access points functioning as a broadband tuner/router. Thus, four separate wireless networks are shown installed on separate floors of building 84.

With reference to the first floor plan shown in FIGS. 14A-14C, access point 85 transmits video data packets on channel #1 to repeaters 91 and 92, which then both repeat the received data packets on channel #2. Repeaters 93 and 94 (both on channel #3) are shown branching off of repeater 91. Repeater 95 (channel #4) is coupled to the network through repeater 93. Repeater 96 (channel #4) branches off of repeater 94; repeater 97 (channel #1) branches off of repeater 96; and repeater 98 (channel #2) branches off of repeater 97 to complete the first floor topology. Note that repeater 97 is able to reuse channel #1 since it is located a relatively far distance from source access point 85, which uses the same channel. Additionally, the side elevation view of FIG. 14B shows there are no devices on the second floor network above repeater 97 that use channel #1. For the same reasons, repeater 98 is able to reuse channel #2.

It is appreciated that access point 85 only needs one transceiver to create the repeating wireless network shown in FIGS. 14A-14C. The internal transceiver of access point 85 transmits on channel #1, which transmission is then received by the upstream transceivers of repeaters 91 and 92. Repeater 91 transmits using its downstream transceiver on channel #2, which is then picked up by the two upstream transceivers of repeaters 93 and 94, each of which, in turn, transmits on their downstream transceiver to repeaters 95 and 96, respectively, and so on. Note that in this example, access point 98 only transmits downstream to destination media devices, not to another access point. That is, access point 98 does not function as a repeater; rather, access point 98 simply communicates with the destination media devices in its local area.

Practitioners in the communications arts will also understood that nearby access points transmitting on the same channel in the first floor network shown in FIGS. 14A-14C (e.g., repeaters 91 & 92) do not interfere with one another. The reason why is because a given message or data packet is only transmitted down one path of the topology tree at a time. Moreover, according to the embodiment of FIGS. 14A-14C, each access point in the topology tree does not need an arbitrary number of transceivers to repeat data messages across the network; an upstream transceiver and a downstream transceiver suffices. As described previously, an additional 2.4 GHz band transceiver may be included, for example, to provide communications with 802.11b or 802.11g compatible devices. It should be understood, however, that there is no specific limit on the number or type of transceivers incorporated in the access points or repeaters utilized in the wireless network of the present invention.

The self-configuring feature of the present invention is also apparent with reference to FIGS. 14A-14C. According to one embodiment of the present invention, a processor in the source access point executes a program or algorithm that determines an optimal set of frequency channels allocated for use by each access point or repeater. An optimal set of channels is one that does not include over-lapping channels and avoids channels used by other interfering devices in the same locality. An optimal channel configuration may also be selected that maximizes channel re-use. Further, once a set of the channels has been chosen for use by the access points, modulated power can be reduced to the minimum needed to achieve maximum bandwidth across each link so as to reduce signal reflections. As discussed below, the wireless network of the present invention may also adapt to changes to the network by reconfiguring the channel assignments, such as when new repeaters are added, existing ones removed, or when the network experiences disturbances caused by other interfering devices (e.g., from a neighboring network).

Note that in FIGS. 14A-14C, the first floor wireless network has been configured such that the channels used by each of the access points do not interfere with other devices located on other floors of building 84. The side elevation view of FIG. 14B shows that interference sources are present in the upper stories of building 84 above the wireless network created by source access point 85. To avoid interference with the devices using channels #5-#10 on the second through fourth floors, the first floor network has configured itself to use channel #1, #2, #3 and #4.

The circuitry for controlling the self-configuration process may either be centralized in the source access point or distributed throughout the access points comprising the wireless network. In either case, the system may proceed through a process of iteration, wherein every possible combination of channels allocated to the access points may be tried in order to find an optimal combination of frequency channels. In one embodiment, the network hops through the frequency channels automatically so that an optimal combination of frequencies may be determined. Within a matter of seconds, the network may complete iterating through all permutations of channels to identify which combination of frequencies produces the best result. One example of a best result is the highest average bandwidth from source to each destination. Another best result may be defined as one which optimizes bandwidth to certain destination devices. For instance, if a particular destination device (e.g., a video receiver) requires higher bandwidth than other destination devices, then allocation of channels may be optimized to provide higher bandwidth in the network path to the particular destination device at the expense of lower bandwidth to other devices.

The system of the present invention also functions to keep modulated power in the network to a minimum. It may be necessary in some instances, for example when transmitting through many walls to a maximum range, to use a lot of power. In other instances, a repeater is located nearby and there may be few walls to transmit through, so less transmission power is required. When the network initially turns on, the access points may transmit at maximum power to establish a maximum range of communication. However, once communications have been established with all of the repeaters in the network, the power output may be reduced to a level that provides adequate signal transmission characteristics (i.e., a threshold signal strength), but no more. In other words, the network may throttle power output, keeping it only as high as it needs to be to create a strong signal to the next repeater. One benefit of such an operation is that it reduces signal reflections that may interfere with the reception quality. Another benefit is less power consumption.

Another benefit of the power management feature of the present invention is that by having a given channel prorogate less distance, you create the opportunity to reuse that channel in the network at an earlier point in the topology than if transmissions were at maximum power.

According to one embodiment, the wireless network of the present invention automatically detects channel conflicts that arise, and adapts the network to the conflict by reconfiguring itself to avoid the conflict. That is, the access points monitor the signal quality of the wireless transmissions on a continual basis. Any disturbance or conflict that causes signal transmissions to fall below an acceptable quality level may trigger an adaptive reconfiguration process.

By way of example, FIGS. 15A and 15B show plan and side elevation views, respectively, of the wireless network previously shown in FIGS. 14A & 14B, but with a disturbance generated by the activation of a cordless phone (shown by square 101 operating on channel #2) in building 84. As shown, the interference caused by cordless phone 101 is within the range of repeaters 91 and 92, thereby affecting the transmissions of those repeaters. In accordance with one aspect of the present invention, the network automatically detects the channel conflict and reconfigures itself to overcome the interference.

FIGS. 16A and 16B illustrate the network of FIGS. 15A and 15B after reconfiguration to overcome the channel conflict caused by cordless phone 101. As can be readily seen, building 84 is populated with many existing channels in use. Because of the channel usage in the upper stories, the network cannot simply swap out the channels used by repeaters 91 & 92 with a different one. Instead, in this example, the wireless network of the present invention replaces channel #1 of source access point 85 with channel #5. That permits channel #1 to replace channel #2 in both repeaters 91 & 92. In addition, because the channel #1 usage by repeaters 91 & 92 would be too close to the channel #1 usage by repeater 97 (see FIGS. 15A & 15B), the wireless network also replaces channel #1 of repeater 97 with channel #8. Note that channel #8 can be used for repeater 97 because its only other use in building 84 is on the fourth floor at the opposite end of the structure. Repeater 98 is also shown reconfigured to use channel #1 instead of channel #2.

The adaptation process discussed above may be performed in a similar manner to the self-configuration process previously described. That is, all of the different possible combinations of channels may be tried until the network identifies an optimal combination that works to overcome the channel conflict without creating any new conflicts. The adaptation process may rely upon an algorithm that does not attempt to change or move channels which have already been established. In the example of FIGS. 16A and 16B, for instance, channel #3, used by repeaters 93 & 94, and channel #4, used by repeaters 95 & 96, are left in place. In other words, regardless of the origin of a channel conflict, the network of the present invention adapts to the disturbance by reconfiguring itself to optimize performance.

In the unlikely event that a channel conflict is truly unavoidable, i.e., no combination of channels exists that would allow the network to extend from the source to any destination without conflict (as could occur in a situation where there is heavy use of channels by neighboring networks) the wireless network of the present invention can reduce bandwidth and still maintain connectivity. Such a scenario is depicted in FIGS. 17A & 17B and FIGS. 18A & 18B.

FIGS. 17A & 17B illustrate the conflict previously shown in FIGS. 15A & 15B, wherein a cordless phone 101 is activated, except with an additional channel conflict created by a wireless camera 102 operating on channel #5. Here, due to the additional conflict caused by camera 102, there is no combination of channel allocations that might allow the network to reach from any source to any destination without conflict. In such a situation, the network has adapted by reusing the same channel in consecutive branches of the repeater topology, as shown in FIGS. 18A & 18B. FIGS. 18A & 18B show the reconfigured wireless network with repeaters 91 and 92 using channel #3. Because repeaters 93 and 94 also operate on channel #3 the bandwidth of the network is reduced by 50%. The benefit of the channel switching, however, is still preserved throughout the remainder of the network. Unlike a conventional repeating network that continues to lose bandwidth through each leg or repeating segment of the network, in the special situation exemplified in FIGS. 18A & 18B there is the only place in the network where bandwidth is lost. Moreover, the total bandwidth loss stays at 50%; that is, bandwidth is not continually reduced by each successive repeating segment of the network.

In yet another embodiment of the present invention, simultaneous wireless networks may be created to run at the same time. Simultaneous wireless networks may be desirable in certain applications, say, where there are three HDTV sets each operating at 15 Mbps. If the backbone of the primary network operates at 36 Mbps, the available bandwidth is insufficient to accommodate all three screens. The solution provided by the present invention is to install a second video tuner (i.e., a second source access point) and double up the number of repeaters through each branch of the rest of the topology.

Figure 19:
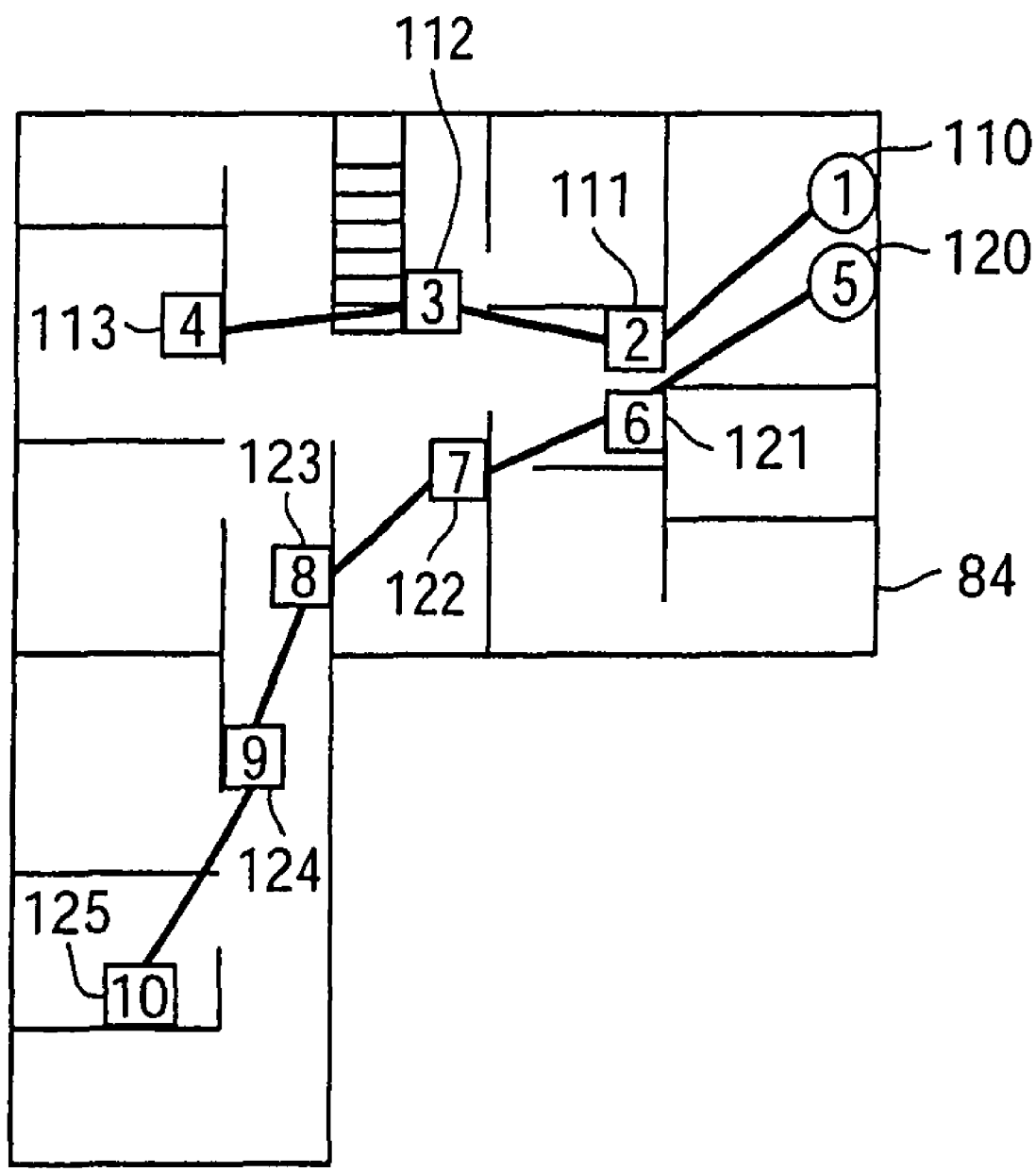
FIG. 19 is a floor plan showing two simultaneous wireless networks operating in a building according to one embodiment of the present invention.

FIG. 19 is a floor plan showing two simultaneous wireless networks operating in a building 84 to increase bandwidth. Such an arrangement is ideally suited to support multiple HDTV video streams. In the example of FIG. 19 access points 110 and 120 each comprise a wireless video tuner or router with a broadband connection. Access point 110 is shown operating on channel #1 and access point 120 is shown operating on channel #5. In this case, separate paths are created to the upper left and lower left sections of the floor plan. The path from access point 110 includes repeaters 111, 112 and 113 on respective channels #2, #3 and #4. Meanwhile, the path from access point 120 is implemented using repeaters 121, 122, 123, 124 and 125 on channels #6, #7, #8, #9 and #10, respectively.

It should be understood that as long as there are a sufficient number of channels available, bandwidth can be increased arbitrarily in the arrangement of FIG. 19. In other words, three, four, or more simultaneously running wireless networks may be implemented in a home or office environment to arbitrarily increase bandwidth to meet increasing data rate demands. If an adequate number of channels is available (e.g., allowing extension of the network across a sufficient distance for channel reuse), there is no limitation on the bandwidth that can be achieved in accordance with the present invention.

Figure 20:
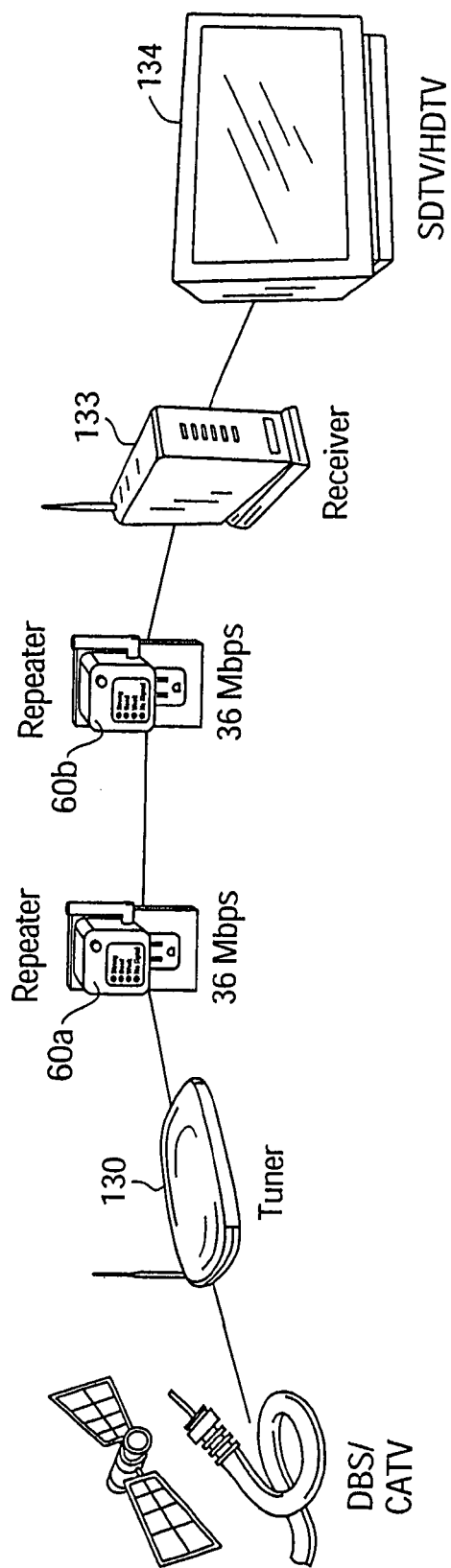
FIG. 20 shows a wireless network according to another embodiment of the present invention.

The security features provided by the wireless network of the present invention are discussed in conjunction with the example of FIG. 20. FIG. 20 shows a wireless network according to one embodiment of the present invention which includes a tuner 130 coupled to receive real-time streaming media from a source, such as DBS or CATV. Tuner 130 transmits the media content provided by the source, possibly through one or more repeaters, to a destination device, which in this example, comprises a wireless receiver 133, connected to a standard definition television 134. The media content provided by the source is, of course, encrypted. Only authorized users or subscribers are permitted access to the media content. Tuner 130 typically receives the media data from the cable or satellite provider in a digitally encrypted form. This encryption is maintained through the wireless network to SDTV 134. Wireless receiver 133 is a trusted device; that is, it is secured during installation by exchange of encryption key information. Consequently, receiver 133 is able to decrypt the media content when it arrives across the network from tuner 130. Thus, data security is preserved across the entire span of the wireless network, potentially over many repeater hops, so that interlopers or unscrupulous hackers are prevented from gaining unauthorized use of the wireless local area network.

In addition to encrypted data, the wireless network of the present invention may also transmit presentation layer data and information, such as overlay graphics and remote controls for interactive experiences. To put it another way, the network may also carry information both upstream and downstream.

Practitioners in the art will further appreciate that tuner 130 may also digitize analog video, decode it, and compress the received source data prior to transmission across the wireless network, in addition to receiving compressed digital video. In the case where compressed video is transmitted by tuner 130, receiver 133 decompresses the data as it is received. Alternatively, decompression circuitry may be incorporated into television 134 (or into an add-on box) that performs the same task. Receiver 133, or a wireless-enabled television 134, may identify itself as a device that requires high bandwidth to the upstream wireless repeaters 60 and tuner 130. When the network re-configures itself to avoid an interference source, it may take this requirement into consideration during channel allocation to optimize bandwidth in the network path from tuner 130 to receiver 133 or wireless-enabled television 134.

In an alternative embodiment, tuner 130 decrypts the real-time media stream as it is received from the satellite or cable service provider, and then re-encrypts that same data using a different encryption scheme that is appropriate for the wireless local area network. Thus, in this alternative embodiment, only devices properly enabled by the network are authorized to play media content received via that network. Note that because the wireless network in this embodiment of the present invention is a single or uni-cast signal, it can only be received by a properly enabled receiver that is authorized with appropriate encryption key information. In other words, the media content transmitted across the network from source to destination is not simply available to anyone who happens to have a receiver.

Still another possibility is for the cable or satellite company to grant an entitlement to tuner 130 that allows a certain limited number of streams (e.g., three or four) to be transmitted in a particular household or office environment, regardless of the number of media client devices that actually receive the media content. This is simply another way to restrict distribution of the media content.

Figure 21:
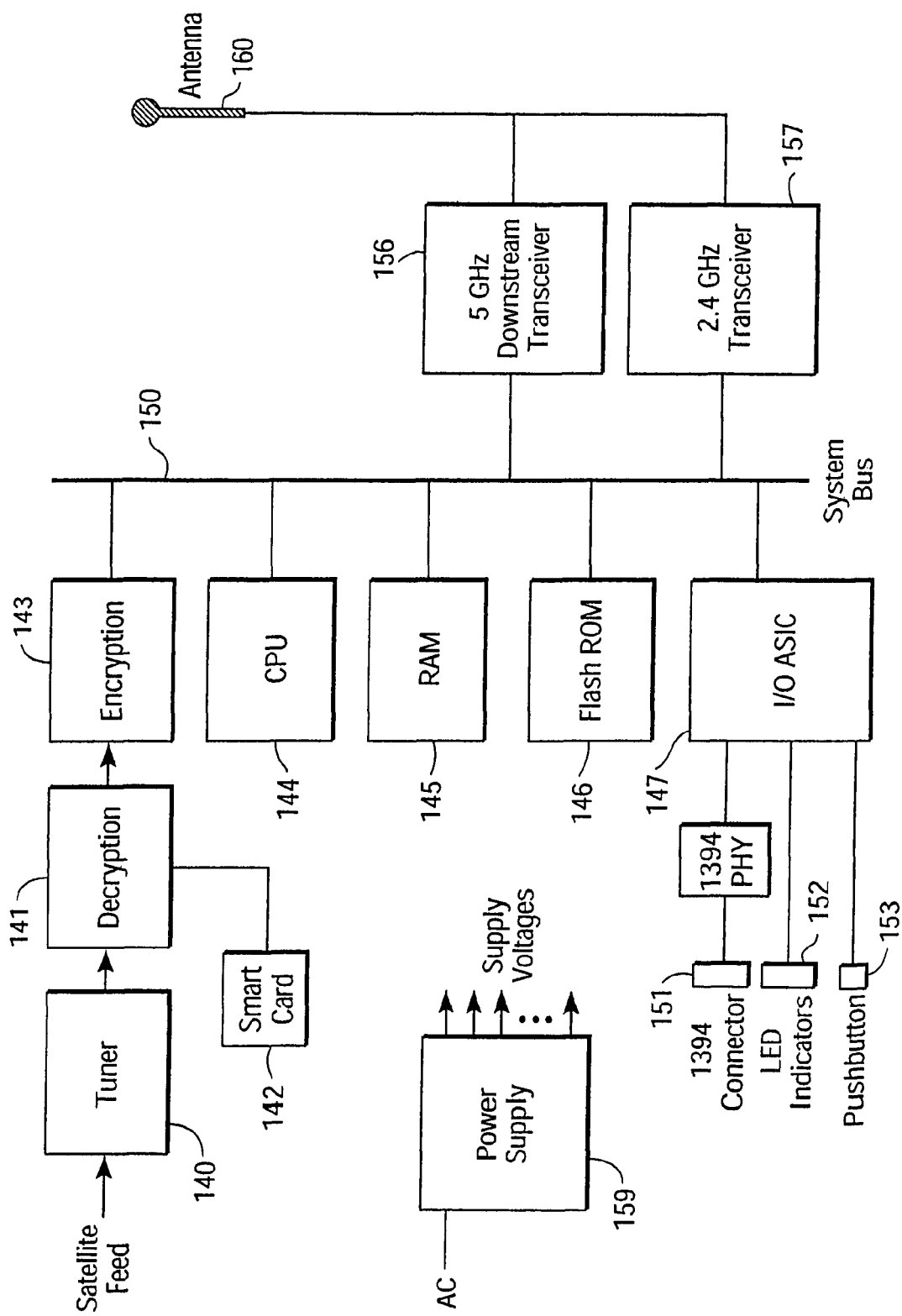
FIG. 21 is a circuit block diagram of the basic architecture of a DBS tuner according to one embodiment of the present invention.

In yet another alternate embodiment, tuner 130 receives video data packets from a DBS or digital cable TV source and buffers the packets in its internal RAM (see FIG. 21). The video data packets may then be grouped together into a larger packet. For example, an MPEG-2 transmission may have 188-byte packets, which would result in low efficiency over a 802.11x transport. By grouping these relatively small packets into a larger packets (e.g., twelve 188-byte packets grouped together to form a 2.256-Kbyte packet), better 802.11x efficiency can be achieved. Many conventional 802.11x networks incur a high probability of a transmission error when transmitting such large packets over long distances. The occurrence of such an error, of course, requires re-transmission of the packet, with the same risk of another error happening during the re-transmission. By utilizing repeaters separated by relatively short distances (i.e., within the maximum bandwidth range of the repeaters), the transmission error rate is dramatically reduced (e.g., $<10^{-6}$) as compared to conventional wireless networks. Thus, because larger packets (e.g., 500 bytes or greater) may be utilized, the wireless network of the present invention is capable of achieving a high effective throughput (e.g., as much as 36 Mbps or greater) at low error rates. By way of example, and not limitation, one embodiment of the present invention is capable of achieving approximately 32 Mbps effective throughput, transmitting 2.256-Kbyte packets across an 802.11x network of arbitrary length with a bit error rate of about $10^{-7}$ or less.

Another feature of the present invention is the ability to serendipitously provide connectivity to any user who happens to be within the range of the wireless network. If, for instance, a wireless repeater or access point is mounted near a window or on the rooftop of a building, the outdoor range of the wireless network may be extended to a nearby park or other buildings (e.g., a cafe or coffeehouse). A user who has a laptop computer configured with an existing wireless transmitter and receiver, and who happens to be within the range of the wireless network, could connect to the Internet; view a video program; listen to an audio program; or store media content on its disk drive for retrieval and play at a later time (assuming proper entitlements). In other words, the present invention provides ever greater mobility by allowing portable computer users to take media content with them.

Media content may also be downloaded from the wireless network for archival storage on a wireless disk server.

Those of ordinary skill in the art will further appreciate that the wireless network of the present invention is client device independent. It does not matter to the network what type of device is at the destination end receiving the transmitted media content. Video and graphics content carried on the WLAN of the present invention can play on multiple types of television, computers (e.g., Macintosh® or PC), different MP3 players, PDAs, digital cameras, etc. By way of example, any PC or Mac equipped with a 2.4 GHz band wireless card can detect the presence of the wireless network. Once it has detected the running wireless network, it may download a driver that contains the necessary security and protocol information for accessing the media content. Readily available software, such as RealPlayer®, QuickTime®, or Windows® MediaPlayer, may be used to play content provided through the network.

With reference now to FIG. 21, a circuit block diagram showing the architecture of a DBS tuner according to one embodiment of the present invention is shown. Similar to the architecture of the repeater unit shown in FIG. 11, a CPU 144, a RAM 145, a Flash ROM 146, and I/O ASIC 147 are coupled to a system bus 150. A 5 GHz band downstream transceiver 156 and a 2.4 GHz band transceiver 157, both of which are connected to antenna 160, are also coupled to system bus 150. (An upstream transceiver is not needed at the source end.)

Data from the satellite feed is received by a tuner 140 and output to decryption circuitry 141, which may be configured to receive the latest encryption key information from a smart card 142. The decrypted digital stream output from block 141 is then re-encrypted by encryption circuitry 143 prior to being sent over the wireless network. As discussed above, the re-encryption is a type of encryption appropriate for the wireless network, not one that is locked into the satellite encryption scheme.

The architectural diagram of FIG. 21 is also shown including connector, indicator, and pushbutton blocks 151-153, as previously described in conjunction with FIG. 11. A power supply unit 159 provides a supply voltage to the internal electronic components of the tuner.

Figure 22:
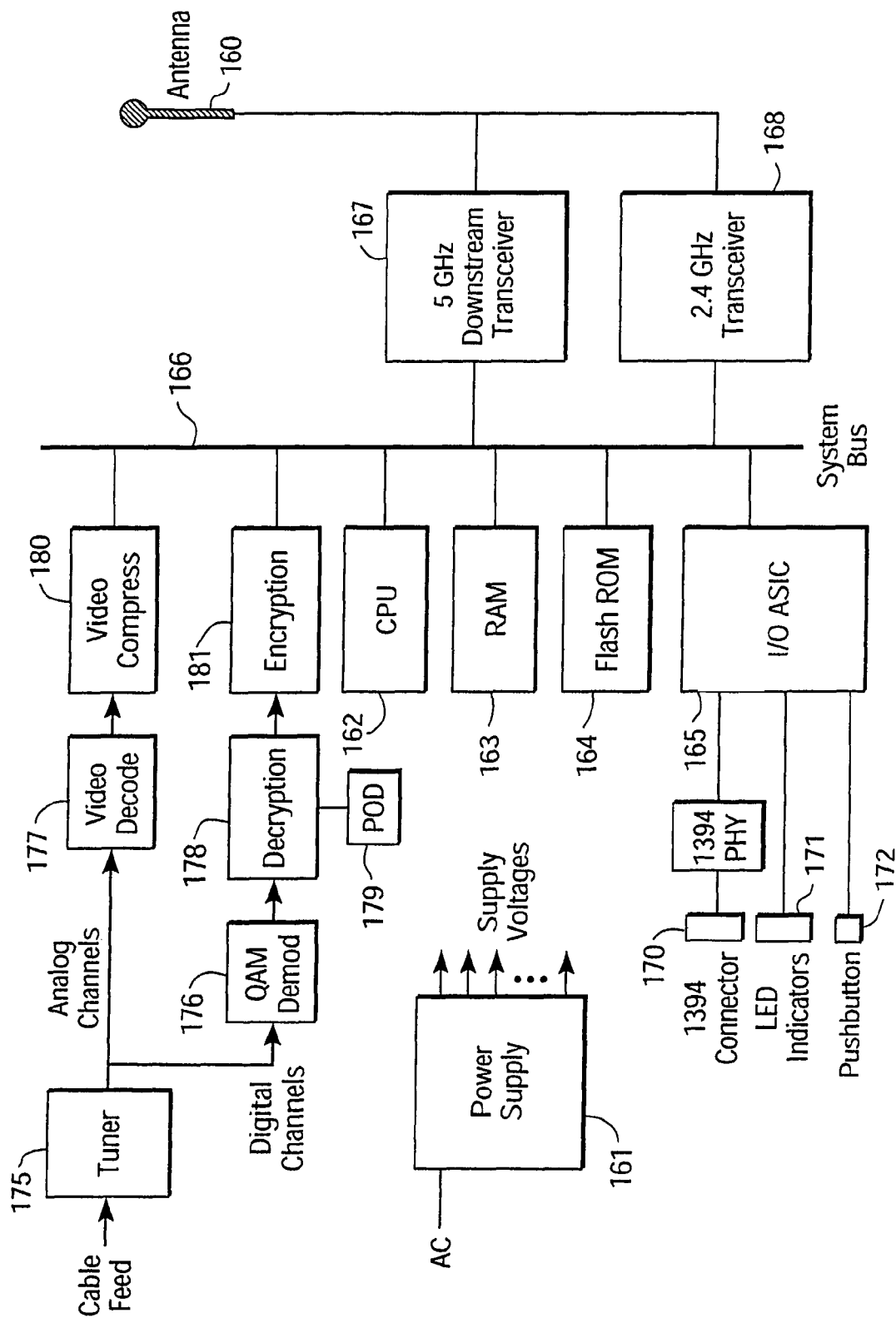
FIG. 22 is a circuit block diagram of the basic architecture of a cable television tuner in accordance with one embodiment of the present invention.

FIG. 22 is a circuit block diagram illustrating the basic architecture of a cable television tuner in accordance with one embodiment of the present invention. Practitioners in the art will appreciate that the architecture of FIG. 22 is somewhat more complicated due to the presence of both analog and digital signal channels. Elements 161-172 are basically the same as the corresponding components of the DBS tuner described above.

Tuner 175 receives the cable feed and separates the received signal into analog or digital channels, depending on whether the tuner is tuned to an analog or digital cable channel. If it is an analog channel, the video content is first decoded by block 177 and then compressed (e.g., MPEG2 or MPEG4) by circuit block 180 prior to downstream transmission. If it is a digital channel, a QAM demodulator circuit 176 is used to demodulate the received signal prior to decryption by block 178. A point of deployment (POD) module 179, which includes the decryption keys for the commercial cable system, is shown coupled to decryption block 178. After decryption, the streaming media content is re-encrypted by block 181 before transmission downstream on the wireless network.

FIG. 22 shows a one-way cable system. As is well-known to persons of ordinary skill in the art, a two-way cable system further includes, a modulator for communications back up the cable, as, for example, when a user orders a pay-per-view movie.

Figure 23:
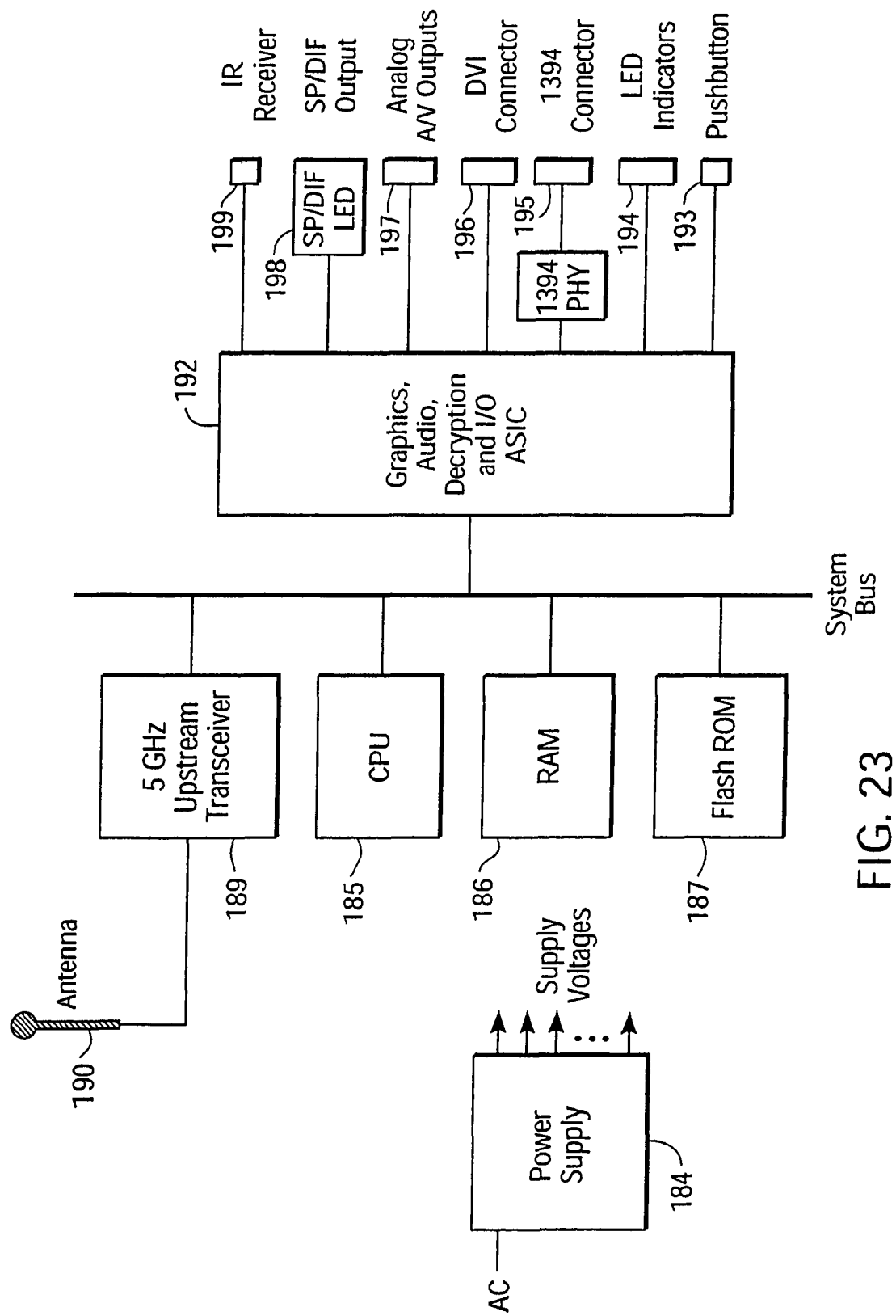
FIG. 23 is a circuit block diagram of the basic architecture of a wireless receiver in accordance with one embodiment of the present invention.

FIG. 23 is a circuit block diagram illustrating the basic architecture of a wireless receiver in accordance with one embodiment of the present invention. Like the repeater, DBS tuner, and cable tuner architectures described previously, the wireless receiver shown in FIG. 23 includes a CPU 185, a RAM 186, and a Flash ROM 187 coupled to a system bus 188. A power supply unit 184 provides a supply voltage to each of the circuit elements shown.

A 5 GHz band upstream transceiver 189 is also shown in FIG. 23 coupled to an antenna 190 and to system bus 188. A single transceiver is all that is required since the receiver of FIG. 23 does not transmit downstream and it outputs directly to a display device such as a television. As described earlier, the 5 GHz band offers the advantage of more available channels. Accordingly, I/O ASIC circuitry 192 coupled to bus 188 includes the graphics, audio, decryption, and I/O chips (commercially available from manufacturers such as Broadcom Corporation and ATI Technologies, Inc.) needed to generate the output signals for driving the display device. Accordingly, in addition to elements 193-195 found on the repeater architecture of FIG. 11, I/O ASIC 192 may also provide outputs to a DVI connector 196 (for HDTV), analog audio/video (A/V) outputs 197, an SP/DIF output 198 (an optical signal for surround sound and digital audio), and an infrared receiver port 199 for receiving commands from a remote control unit.

It should be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Furthermore, although the present invention has been described in conjunction with specific embodiments, numerous modifications and alterations are well within the scope of the present invention. Accordingly, the specification and drawings are to be regarded in an illustrative rather than a restrictive sense.

I claim:

1. A repeater for a wireless network comprising:
    a first transceiver that receives data transmitted on a first channel of a first frequency band during odd time intervals;
    a second transceiver coupled to the first transceiver, the second transceiver transmitting data at a data rate of 11 Mbps or greater on the first channel of the first frequency band during even time intervals, the second transceiver not transmitting during the odd time intervals; and
    a third transceiver coupled to the first and second transceivers, the third transceiver transmitting and receiving data in a second frequency band.

2. The repeater of claim 1 wherein the first, second and third transceivers each include a transmitter and a receiver.

3. The repeater of claim 1 wherein the second transceiver receives data on the first channel, and the first transceiver transmits data on the first channel, such that the repeater functions in a bi-directional manner.

4. The repeater of claim 2 wherein the transmitters and receivers of the first and second transceivers are frequency programmable.

5. The repeater of claim 2 wherein the transmitters and receivers of the first, second, and third transceivers are frequency programmable.

6. A wireless local area network (WLAN) comprising:
    a plurality of repeaters arranged in a transmission chain, each repeater having an upstream transceiver coupled to a downstream transceiver, the upstream and downstream transceivers operating in a first frequency band, the upstream transceiver of a first repeater in the transmission chain receiving data on a first channel during even time intervals, and the downstream transceiver of the first repeater transmitting data at a data rate of 11 Mbps or greater on the first channel to a next repeater in the transmission chain during odd time intervals, the downstream transceiver not transmitting during the even time intervals, the upstream transceiver of the next repeater receiving data during the odd time intervals, the downstream transceiver of the next repeater transmitting data at a data rate of 11 Mbps or greater during the even time intervals, the downstream transceiver of the next repeater not transmitting data during the odd time intervals, at least one repeater of the plurality of repeaters including an additional transceiver operating in a second frequency band;

at least one destination device operable to receive data in the second frequency band;

a source device that transmits data to the at least one destination device across the transmission chain of the repeaters.

7. The WLAN of claim 6 wherein the at least one destination device comprises a media receiver connected to a display device.

8. The WLAN of claim 6 wherein the source device operates in the first frequency band.

9. The WLAN of claim 6 wherein either the upstream transceiver or the downstream transceiver operates at any given time interval.

10. The WLAN of claim 6 wherein the source device transmits data in the second frequency band.

11. The WLAN of claim 7 wherein the transmitters and receivers of the upstream and downstream transceivers are frequency programmable, and further wherein each of the repeaters includes a computing means for programming the frequency channels of the upstream and downstream transceivers.

12. The WLAN of claim 6 wherein the first frequency band is a 5 GHz frequency band and the second frequency band is a 2.4 GHz frequency band.

13. A wireless network comprising:

a source device that transmits data on a first frequency channel;

a plurality of repeaters arranged in a tree topology, each of the repeaters having an upstream transceiver to receive the data, a downstream transmitter to send the data across the wireless network, and an additional transceiver, the upstream and downstream transceivers operating on different frequency channels in a first frequency band, the additional transceiver transmitting and receiving data in a second frequency band, the upstream transceiver of a first repeater in the tree topology receiving data during odd time intervals, and the downstream transceiver of the first repeater transmitting data to a next repeater in the tree topology during even time intervals, the downstream transceiver not transmitting during the odd time intervals, the upstream transceiver of the next repeater receiving data during the even time intervals, the downstream transceiver of the next repeater transmitting data during the odd time intervals, the downstream transceiver of the next repeater not transmitting data during the even time intervals; and a destination device that receives the data.

14. The wireless network of claim 13 wherein two or more of the repeaters receive the data from the source device in the first frequency band.

15. The wireless network of claim 13 wherein one of the plurality of repeaters re-transmits the data directly to two or more of the repeaters.

16. The wireless network of claim 13 wherein the source device is coupled to a broadband data network.

17. The wireless network of claim 13 wherein either the upstream or downstream transceiver operates at any given time interval.

18. The wireless network of claim 13 wherein the destination device receives the data in the second frequency band from the additional transceiver.

19. The wireless network of claim 13 wherein the upstream and downstream transceivers each includes a transmitter and a receiver.

20. The wireless network of claim 13 wherein each of the repeaters operate in a bi-directional manner.

21. The wireless network of claim 19 wherein the transmitters and receivers of the upstream and downstream transceivers are frequency programmable.

22. The wireless network of claim 21 wherein each of the repeaters includes a computing means for programming the frequency channels of the upstream and downstream transceivers.

23. The wireless network of claim 13 wherein the first frequency band is a 5 GHz frequency band and the second frequency band is a 2.4 GHz frequency band.

* * * * *